(12) United States Patent
Ito

(10) Patent No.: US 10,684,150 B2
(45) Date of Patent: Jun. 16, 2020

(54) FLOW MEASURING DEVICE

(71) Applicant: DENSO CORPORATION, Kariya, Aichi-pref. (JP)

(72) Inventor: Kengo Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 15/619,832

(22) Filed: Jun. 12, 2017

(65) Prior Publication Data

US 2017/0356775 A1    Dec. 14, 2017

(30) Foreign Application Priority Data

Jun. 14, 2016 (JP) .................................. 2016-118317
Mar. 9, 2017 (JP) .................................. 2017-044476

(51) Int. Cl.
*G01F 1/684* (2006.01)
*F02M 35/10* (2006.01)

(52) U.S. Cl.
CPC ..... *G01F 1/6842* (2013.01); *F02M 35/10386* (2013.01); *G01F 1/684* (2013.01)

(58) Field of Classification Search
CPC ........... G01F 1/684; G01F 1/6842; G01F 1/72
See application file for complete search history.

(56) References Cited

U.S. PATENT DOCUMENTS

| 8,701,474 B2 * | 4/2014 | Tagawa ................. G01F 1/6842 73/114.32 |
| 2013/0008243 A1 | 1/2013 | Tagawa |
| 2015/0168191 A1 | 6/2015 | Morino et al. |

FOREIGN PATENT DOCUMENTS

| JP | 2014-185862 | 10/2014 |
| JP | 2015-068759 | 4/2015 |

* cited by examiner

*Primary Examiner* — Justin N Olamit
(74) *Attorney, Agent, or Firm* — Nixon & Vanderhye P.C.

(57) ABSTRACT

An outlet of a sub passage that returns measured gas, which has passed through a flow sensor, from the sub passage to a main passage opens on an outer wall of a housing toward a downstream side in a reference direction. The outer wall of the housing includes a protrusion on the downstream side of the outlet. When the outlet and the protrusion are projected onto a projection plane perpendicular to the reference direction, the outlet and the protrusion partly overlap with each other on the projection plane. A relationship of $\theta1<\theta2<90°$ is satisfied, where: $\theta1$ is assumed to be an angle formed between a direction from an upstream end to a top, and the reference direction; and $\theta2$ is assumed to be an angle formed between a direction from a downstream end to the top, and the reference direction.

3 Claims, 23 Drawing Sheets

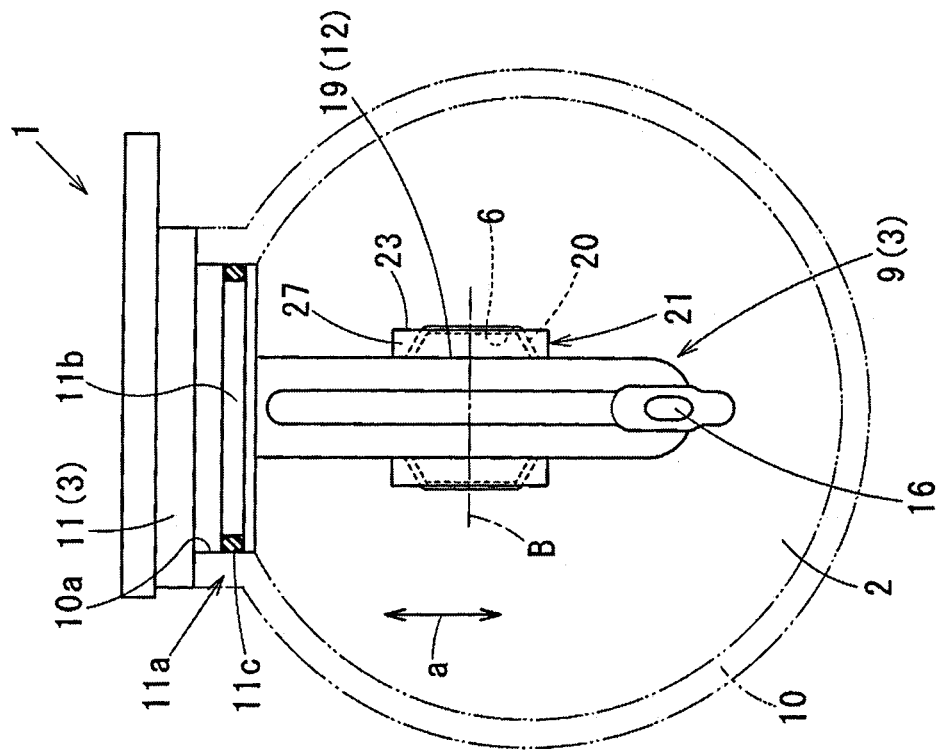
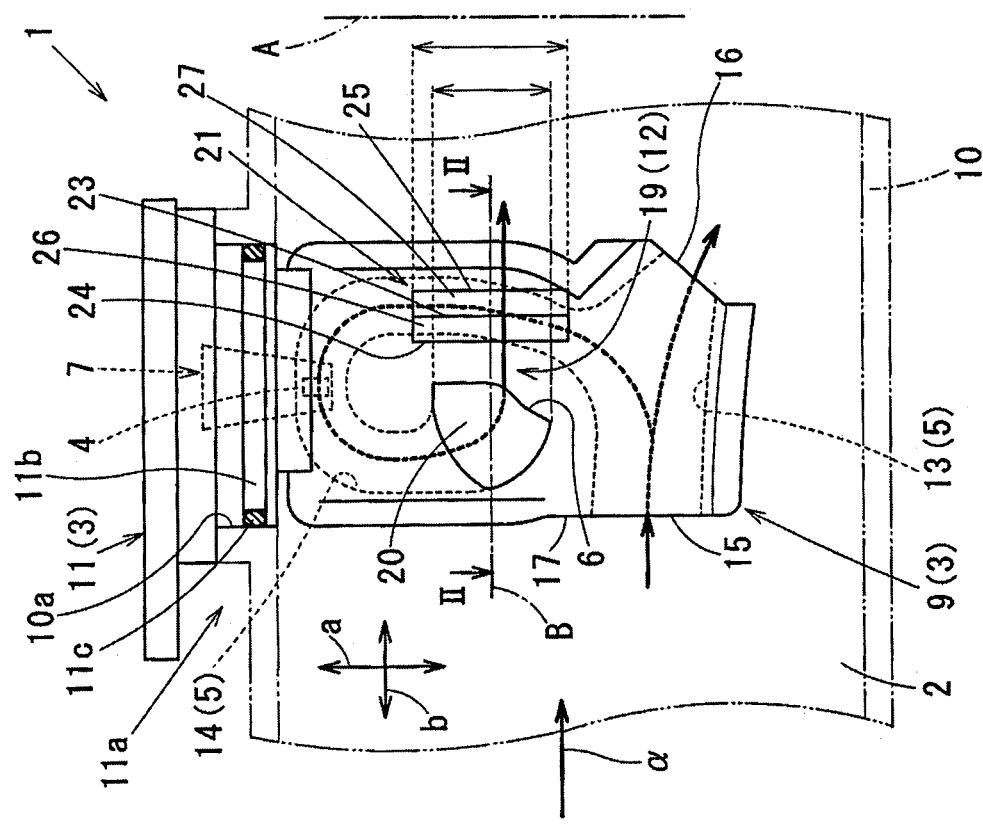
FIG. 1A
FIG. 1B

FLOW MEASURING DEVICE

CROSS REFERENCE TO RELATED APPLICATION

This application is based on Japanese Patent Application No. 2016-118317 filed on Jun. 14, 2016, and Japanese Patent Application No. 2017-44476 filed on Mar. 9, 2017, the disclosures of which are incorporated herein by reference.

TECHNICAL FIELD

The present disclosure relates to a thermal-type flow measuring device that measures a flow rate of measured gas as a measuring object.

BACKGROUND

There is conventionally known a structure of a thermal-type flow measuring device including the following housing and flow sensor. Specifically, in this known structure, the housing includes a sub passage through which measured gas flowing in a main passage is taken in to flow, and the flow sensor is disposed in the sub passage to generate a signal in accordance with the flow rate of the measured gas flowing in the main passage by its heat transfer with the measured gas flowing through the sub passage. The flow measuring device returns the measured gas which has passed through the flow sensor into the main passage through the outlet of the sub passage.

When such a flow measuring device is used for measuring a flow rate of intake air drawn into an internal-combustion engine, the flow measuring device needs to measure not only a flow rate when intake air flows in a forward direction but also a flow rate when intake air flows in a backward direction. Specifically, the flow rate of intake air pulsates based on the operation of the internal-combustion engine, and when the operational state of the internal-combustion engine is in a particular region, the intake air flows in the backward direction as well as in the forward direction due to the pulsation, so that a backflow phenomenon of intake air is periodically repeated.

Thus, to measure the amount of intake air taken into the internal-combustion engine, the flow rate at the time of a backward flow as well as the flow rate at the time of a forward flow may be measured to obtain the amount of intake air taken into the internal-combustion engine based on the flow rates both at the time of a backward flow and at the time of a forward flow. For this reason, there is known a flow measuring device that takes measured gas into the sub passage from the outlet at the time of a backward flow to make the flow sensor sense the gas and that can also measure the flow rate of the gas at the time of a backward flow.

There is known a configuration that limits the inflow of intake air at the time of a backward flow by providing a protrusion on a downstream side of the outlet to improve the accuracy of measurement of the flow measuring device that can measure the flow rate at the time of a backward flow (see, e.g., JP2013-019674A). Specifically, in the flow measuring device in JP2013-019674A, the outlet opens toward the downstream side in the flow direction of the main passage. The measured gas which has flowed out of the outlet at the time of a forward flow flows in the same direction as the flow of the main passage along the flat surface of the outer wall of the housing. The protrusion exists on this flat surface of the outer wall of the housing on a downstream side of the outlet, and this protrusion limits the inflow of intake air at the time of a backward flow.

However, the downstream surface of the shape of the protrusion in JP2013-019674A rises perpendicularly to the flat surface of the outer wall of the housing. Thus, at the time of a backward flow, a flow separation is easily caused near the top of the protrusion, and the amount of air flowing into the sub passage becomes slightly insufficient. Consequently, the measurement accuracy can be reduced depending on the operational state of the internal-combustion engine.

SUMMARY

The present disclosure addresses at least one of the above issues. Thus, it is an objective of the present disclosure to eliminate an insufficient state of an amount of measured gas flowing into a sub passage at time of a backward flow, thereby restricting reduction of measurement accuracy of a flow measuring device.

To achieve the objective of the present disclosure, there is provided a flow measuring device adapted to be inserted in a main passage through a hole, which is provided at a pipe defining the main passage, and to be fixed to the pipe. The flow measuring device generates a signal in accordance with a flow rate of measured gas in the main passage, and includes a housing and a flow sensor. The housing includes a sub passage, through which measured gas flowing in the main passage is taken in to flow, and is inserted in the main passage. The housing includes a sealing part that prevents a leak of measured gas at the hole. The flow sensor is disposed in the sub passage to generate the signal in accordance with the flow rate of measured gas in the main passage by heat transfer between the flow sensor and measured gas flowing through the sub passage. A direction connecting an upstream end and a downstream end of the sealing part is defined as a reference direction. An outlet of the sub passage that returns measured gas, which has passed through the flow sensor, from the sub passage to the main passage opens on an outer wall of the housing toward a downstream side in the reference direction. The outer wall of the housing includes a protrusion on the downstream side of the outlet. When the outlet and the protrusion are projected onto a projection plane perpendicular to the reference direction, the outlet and the protrusion partly overlap with each other on the projection plane. With regard to an upstream end, a downstream end, and a top of the protrusion, a relationship of $\theta 1 < \theta 2 < 90°$ is satisfied, where: $\theta 1$ is assumed to be an angle formed between a direction from the upstream end to the top, and the reference direction; and $\theta 2$ is assumed to be an angle formed between a direction from the downstream end to the top, and the reference direction.

To achieve the objective of the present disclosure, there is also provided a flow measuring device adapted to be inserted in a main passage through a hole, which is provided at a pipe defining the main passage, and to be fixed to the pipe. The flow measuring device generates a signal in accordance with a flow rate of measured gas in the main passage, and includes a housing and a flow sensor. The housing includes a sub passage, through which measured gas flowing in the main passage is taken in to flow, and is inserted in the main passage. The housing includes a sealing part that prevents a leak of measured gas at the hole. The flow sensor is disposed in the sub passage to generate the signal in accordance with the flow rate of measured gas in the main passage by heat transfer between the flow sensor and measured gas flowing through the sub passage. A direction connecting an upstream end and a downstream end of the sealing part is defined as a reference direction. An outlet of the sub passage that returns measured gas, which has passed through the flow sensor, from the sub passage to the main passage opens on an outer wall of the housing toward a downstream side in the reference direction. The outer wall of the housing includes a protrusion on the downstream side of the outlet. A top of the protrusion is a flat top surface. When the outlet and the protrusion are projected onto a projection plane perpendicular to the reference direction, the outlet and the protrusion partly overlap with each other on the projection plane. The top surface is a line segment on a cross section that is drawn to be parallel to the reference direction and to cut the top surface. With regard to an upstream end and a downstream end of the protrusion, and a midpoint of the line segment, a relationship of θ3<θ4<90° is satisfied, where: θ3 is assumed to be an angle formed between a direction from the upstream end to the midpoint of the line segment, and the reference direction; and θ4 is assumed to be an angle formed between a direction from the downstream end to the midpoint of the line segment, and the reference direction.

To achieve the objective of the present disclosure, there is further provided a flow measuring device adapted to be inserted in a main passage through a hole, which is provided at a pipe defining the main passage, and to be fixed to the pipe. The flow measuring device generating a signal in accordance with a flow rate of measured gas in the main passage and including a housing and a flow sensor. The housing includes a sub passage, through which measured gas flowing in the main passage is taken in to flow. The housing includes a sealing part that prevents a leak of measured gas at the hole.

The flow sensor is disposed in the sub passage to generate the signal in accordance with the flow rate of measured gas flowing in the main passage by heat transfer between the flow sensor and measured gas flowing through the sub passage. A direction connecting an upstream end and a downstream end of the sealing part is defined as a reference direction. An outlet of the sub passage opens toward a downstream side in the reference direction such that measured gas which has flowed out of the outlet flows in the reference direction.

The housing includes a pillar body on the downstream side of the outlet. When the outlet and the pillar body are projected onto a projection plane perpendicular to the reference direction, the outlet and the pillar body partly overlap with each other on the projection plane. A particular cross section of a cross section of the pillar body that is perpendicular to a longitudinal direction of the pillar body includes two tops that project perpendicular to the reference direction, an upstream end that projects into an upstream side in the reference direction, and a downstream end that projects into the downstream side in the reference direction. A relationship of θ5<θ6<90° is satisfied, where: θ5 is assumed to be an angle formed by the two tops and the upstream end on the particular cross section; and θ6 is assumed to be an angle formed by the two tops and the downstream end on the particular cross section.

To achieve the objective of the present disclosure, there is additionally provided a flow measuring device adapted to be inserted in a main passage through a hole, which is provided at a pipe defining the main passage, and to be fixed to the pipe. The flow measuring device generates a signal in accordance with a flow rate of measured gas in the main passage, and includes a housing and a flow sensor. The housing includes a sub passage, through which measured gas flowing in the main passage is taken in to flow. The housing includes a sealing part that prevents a leak of measured gas at the hole. The flow sensor is disposed in the sub passage to generate the signal in accordance with the flow rate of measured gas flowing in the main passage by heat transfer between the flow sensor and measured gas flowing through the sub passage. A direction connecting an upstream end and a downstream end of the sealing part is defined as a reference direction. An outlet of the sub passage opens toward a downstream side in the reference direction such that measured gas which has flowed out of the outlet flows in the reference direction. The sub passage includes a straight passage that extends from the outlet in an opposite direction from the reference direction. The housing includes a pillar body in the straight passage. When the outlet and the pillar body are projected onto a projection plane perpendicular to the reference direction, the outlet and the pillar body partly overlap with each other on the projection plane. A particular cross section of a cross section of the pillar body that is perpendicular to a longitudinal direction of the pillar body includes two tops that project perpendicular to the reference direction, an upstream end that projects into an upstream side in the reference direction, and a downstream end that projects into the downstream side in the reference direction. A relationship of θ5<θ6<90° is satisfied, where: θ5 is assumed to be an angle formed by the two tops and the upstream end on the particular cross section; and θ6 is assumed to be an angle formed by the two tops and the downstream end on the particular cross section.

BRIEF DESCRIPTION OF THE DRAWINGS

The above and other objects, features and advantages of the present disclosure will become more apparent from the following detailed description made with reference to the accompanying drawings. In the drawings:

FIG. 1A is a side view illustrating a flow measuring device in accordance with a first embodiment;

FIG. 1B is a rear view illustrating the flow measuring device of the first embodiment;

DETAILED DESCRIPTION

Figure 2:
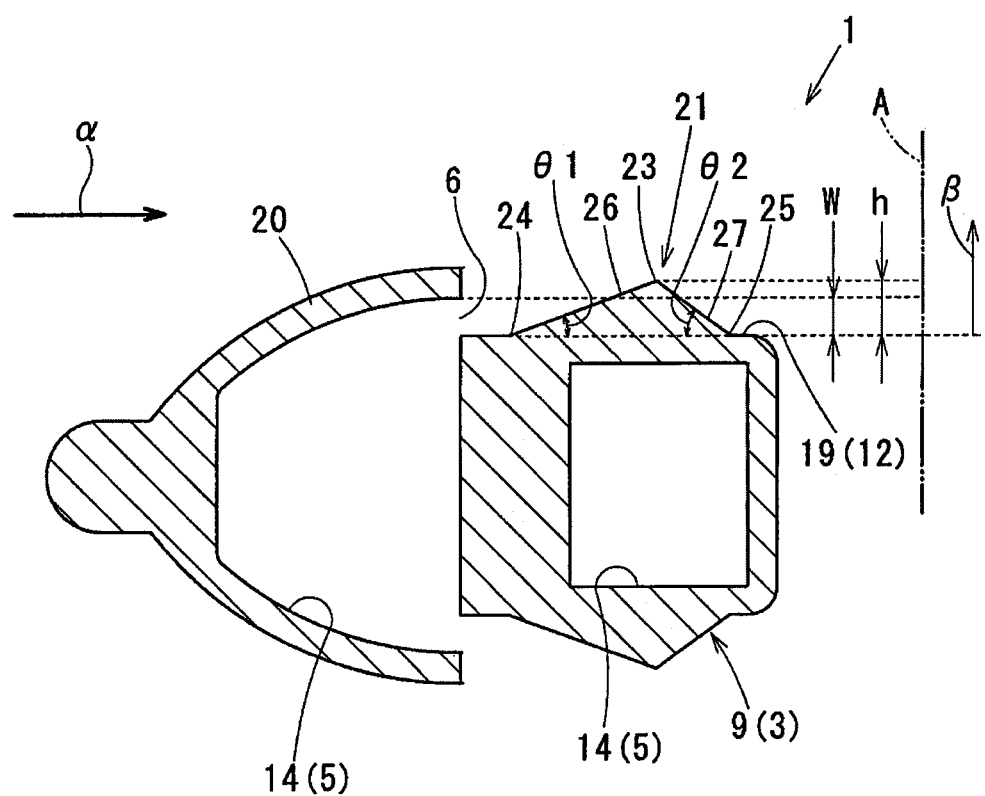
FIG. 2 is a cross-sectional view taken along a line II-II in FIG. 1A, illustrating a main part of the flow measuring device of the first embodiment.

Embodiments will be described below. The embodiments illustrates specific examples, and it goes without saying that the present disclosure is not limited to the embodiments.

First Embodiment

Configuration of a first embodiment will be described. A flow measuring device 1 of the first embodiment measures a flow rate of measured gas as a measuring object using a thermal-type measuring principle. The following description illustrates the aspect whereby the flow measuring device 1 is inserted in and fixed to a main passage 2, through which intake air flows, to measure a flow rate of intake air drawn into an internal-combustion engine. When the operational state of the internal-combustion engine is in a particular region, in the main passage 2, the intake air flows in a backward direction from the internal-combustion engine as well as in a forward direction toward the internal-combustion engine due to the pulsation, so that a backflow phenomenon of intake air is periodically repeated.

As illustrated in FIGS. 1A and 1B, the flow measuring device 1 includes a housing 3 and a flow sensor 4. Specifically, the housing 3 includes a sub passage 5 through which the intake air flowing in the main passage 2 is taken in to flow, and the flow sensor 4 is disposed in the sub passage 5 to generate a signal in accordance with the flow rate in the main passage 2 by the heat transfer between the flow sensor 4 and the intake air flowing through the sub passage 5. The flow measuring device 1 returns the intake air, which has passed through the flow sensor 4, to the main passage 2 through an outlet 6 of the sub passage 5. The signal generated by the flow sensor 4 is outputted from the flow measuring device 1 to an external electronic control unit (which is not shown and may be hereinafter referred to as an ECU) through predetermined processing, and is used for a variety of control processing such as fuel injection control.

The housing 3 will be described in detail below. For example, the flow sensor 4 includes a predetermined semiconductor chip, and a heat generating element or a temperature-sensitive element, which is formed on the surface of this semiconductor chip, and is held by a resin frame 7 to project into the sub passage 5.

For example, the housing 3 is provided with resin as its material, and mainly includes a passage forming part 9 that has the sub passage 5 to project into the main passage 2, and an attached part 11 that is attached and fixed to a pipe 10 defining the main passage 2.

The passage forming part 9 is inserted in the main passage 2 through a circular hole 10a, which is provided at the pipe 10, and the attached part 11 includes a sealing part 11a that seals the part between the main passage 2 and the outside of the pipe 10. The sealing part 11a of the first embodiment is configured by attaching an O-ring 11c to a circular groove 11b, which is provided at the attached part 11, and the part between the main passage 2 and the outside of the pipe 10 is substantially sealed with the O-ring 11c.

Figure 3:
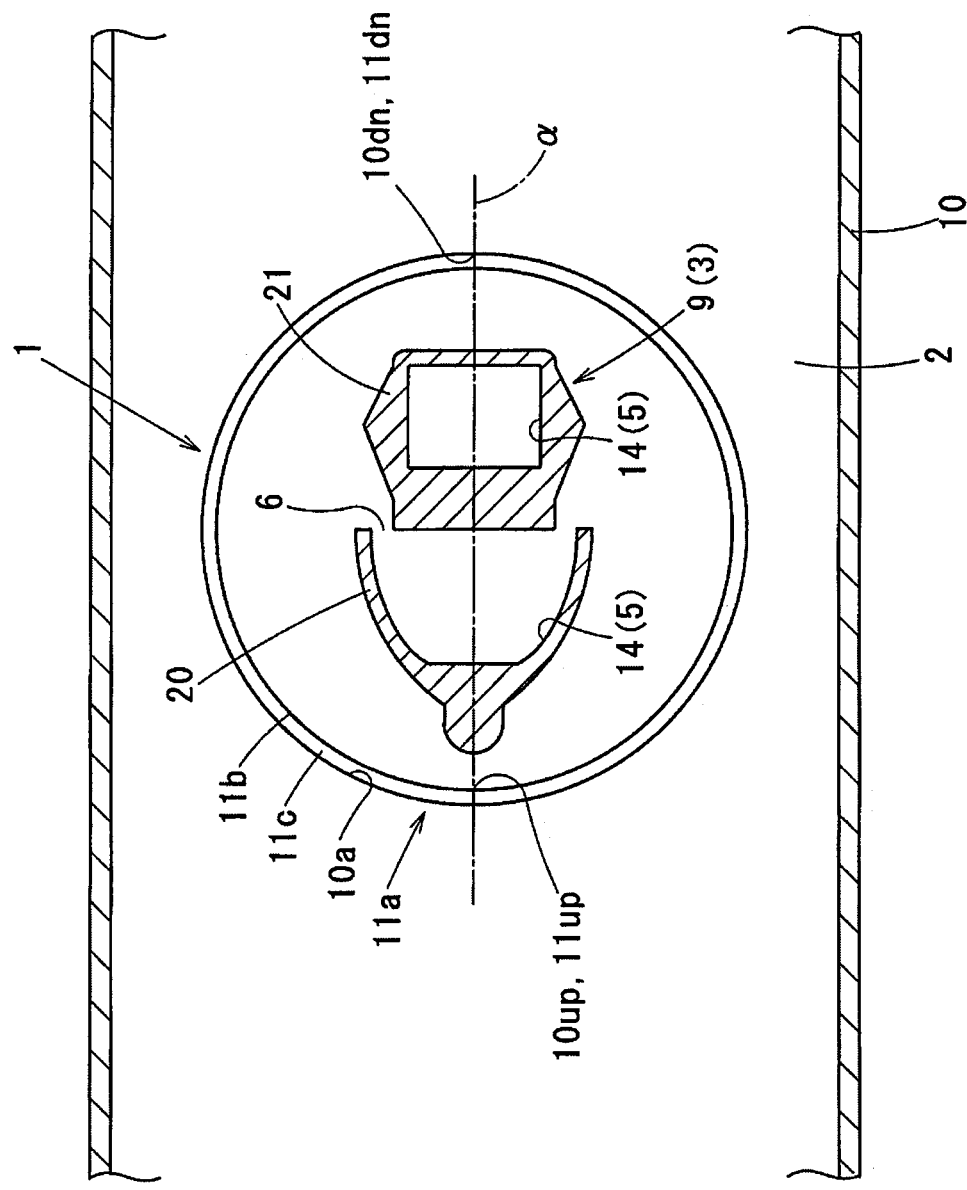
FIG. 3 is a diagram illustrating a reference direction of the flow measuring device of the first embodiment.

As illustrated in FIG. 3, the direction of the line connecting together an upstream end 11up and a downstream end 11dn of the sealing part 11a is defined as a reference direction α. The reference direction α is the same direction as the direction of the line connecting together an upstream end 10up and a downstream end 10dn of the hole 10a, and is the same direction as the direction of the flow passage axis in the region of the main passage 2 in which the flow measuring device 1 exists.

The passage forming part 9 is shaped into a generally rectangular parallelepiped with its outer shape rectangular and plate-like. The passage forming part 9 projects into the main passage 2 such that the two largest-area rectangular surfaces of the surfaces of the generally rectangular parallelepiped are parallel to the reference direction α at the time of a forward flow in the main passage 2 (the two largest-area rectangular surfaces of the surfaces of the generally rectangular parallelepiped may be hereinafter referred to as side surfaces 12). The passage forming part 9 projects into the main passage 2 such that the longitudinal direction α of the side surface 12 is perpendicular to the reference direction α as well as such that the short direction b of the side surface 12 is parallel to the reference direction α.

In the passage forming part 9, the sub passage 5 has a passage configuration to include the following first and second passages 13, 14. Specifically, the first passage 13 guides intake air such that the streamline of the flow from an inlet 15 for intake air toward an outlet 16, which is provided separately from the outlet 6 draws a gentle curved arc. The second passage 14 branches from the first passage 13, and diverts a part of the flow of intake air, which has flowed into the first passage 13 through the inlet 15, to rotate, thereby returning to the main passage 2 through the outlet 6.

The inlet 15 opens toward the upstream side on a long narrow end surface 17 that is located on the upstream side in the reference direction α, and is perpendicular to the reference direction α. The second passage 14 branches between two parts on a downstream side of the flow sensor 4, and the outlet 6 exists on each side surface 12. The outlet 16 opens on an opposite side from the end surface 17 in the reference direction α toward the downstream side in the reference direction α as well as toward the outer periphery of the main passage 2.

As a result of the above configuration, in the passage forming part 9 at the time of a forward flow, a part of the intake air, which has flowed into the first passage 13 through the inlet 15, flows into the second passage 14 to pass through the flow sensor 4, and the intake air, which has passed through the flow sensor 4, is divided between two flows to return to the main passage 2 through the outlets 6. At the time of a backward flow, the intake air, which has flowed into the second passage 14 through the two outlets 6, merges to pass through the flow sensor 4, and the intake air, which has passed through the flow sensor 4, flows into the first passage 13 to return to the main passage 2 through the inlet 15.

Consequently, the flow measuring device 1 can measure a flow rate at the time of a backward flow as well as a flow rate in the main passage 2 at the time of a forward flow. Based on the flow rates both at the time of a forward flow and at the time of a backward flow, the ECU can obtain the amount of intake air taken into the internal-combustion engine. At the time of a forward flow, a part of the intake air, which has flowed into the first passage 13 through the inlet 15, flows in the first passage 13 without flowing into the second passage 14 to return to the main passage 2 through the outlet 16. A part of the first passage 13 on a downstream side of the branch port for the second passage 14 has a function of restricting the dust, which has flowed in through the inlet 15 together with intake air, from flowing toward the second passage 14 to prevent the damage to the flow sensor 4 from the dust.

Characteristics of the first embodiment will be described below. In the flow measuring device 1 of the first embodiment, a flat surface 19 that is located parallel to the reference direction α exist on each side surface 12 of the housing 3, and an opening (not shown) of the second passage 14 exists on each flat surface 19, as illustrated in FIGS. 1A to 2. By covering this opening with a cover 20, the outlet 6 is formed between the cover 20 and the flat surface 19, and the outlet 6 opens toward the downstream side in the reference direction α. Thus, the intake air, which has flowed out through the outlet 6, flows along the flat surface 19 in the reference direction α.

A protrusion 21 exists on the flat surface 19 on a downstream side of the outlet 6. The protrusion 21 has a linear shape parallel to the longitudinal direction α, and the height h of the protrusion 21 from the flat surface 19 is higher than the width W of the outlet 6 in the direction perpendicular to the flat surface 19 (which may be hereinafter referred to as a protruding direction β). When the outlet 6 and the protrusion 21 are projected onto a projection plane A that is perpendicular to the reference direction α, the outlet 6 and the protrusion 21 partly overlap with each other on the projection plane A. More specifically, on the projection plane A, the outlet 6 is included in the protrusion 21 with regard to the range in the longitudinal direction α, and the outlet 6 is included in the protrusion 21 with regard to the range in the protruding direction β.

A top 23 of the protrusion 21 is a line parallel to the longitudinal direction α, and an upstream end 24 and a downstream end 25 of the protrusion 21 in the reference direction α are also lines parallel to the longitudinal direction α. A flat surface 26 that is inclined by an angle θ1 relative to the reference direction α is located between the upstream end 24 and the top 23, and a flat surface 27 that is inclined by an angle θ2 relative to the reference direction α is located between the downstream end 25 and the top 23.

When the angles θ1, θ2 are rephrased into another expression on the particular cross section B of the cross section of the protrusion 21 that is perpendicular to the flat surface 19 and parallel to the reference direction α, the angle θ1 is formed between the direction from the upstream end 24 to the top 23, and the flat surface 19, and the angle θ2 is formed between the direction from the downstream end 25 to the top 23, and the flat surface 19. A relationship of θ1<θ2<90° is satisfied between the angles θ1, θ2.

Effects of the first embodiment will be described below. In the flow measuring device 1 of the first embodiment, the flat surface 19 serving as the outer wall of the housing 3 exists, and the flat surface 19 is parallel to the reference direction α. The outlet 6 opens toward the downstream side in the reference direction α such that the intake air, which has flowed out of the outlet 6, flows along the flat surface 19 in the reference direction α. The protrusion 21 exists on the flat surface 19 on a downstream side of the outlet 6. The outlet 6 and the protrusion 21 partly overlap with each other on the projection plane A.

With regard to the top 23, the upstream end 24, and the downstream end 25 of the protrusion 21 on the particular cross section B of the protrusion 21, on the assumption of the angle θ1 that is formed between the direction from the upstream end 24 to the top 23, and the reference direction α, and the angle θ2 that is formed between the direction from the downstream end 25 to the top 23, and the reference direction α, the relationship of θ1<θ2<90° is satisfied. This can restrict the occurrence of a flow separation near the top 23 of the protrusion 21 at the time of a backward flow. Thus, an insufficient state of the amount of intake air flowing into the sub passage 5 at the time of a backward flow can be eliminated, to restrict the reduction of measurement accuracy of the flow measuring device 1.

Figure 4:
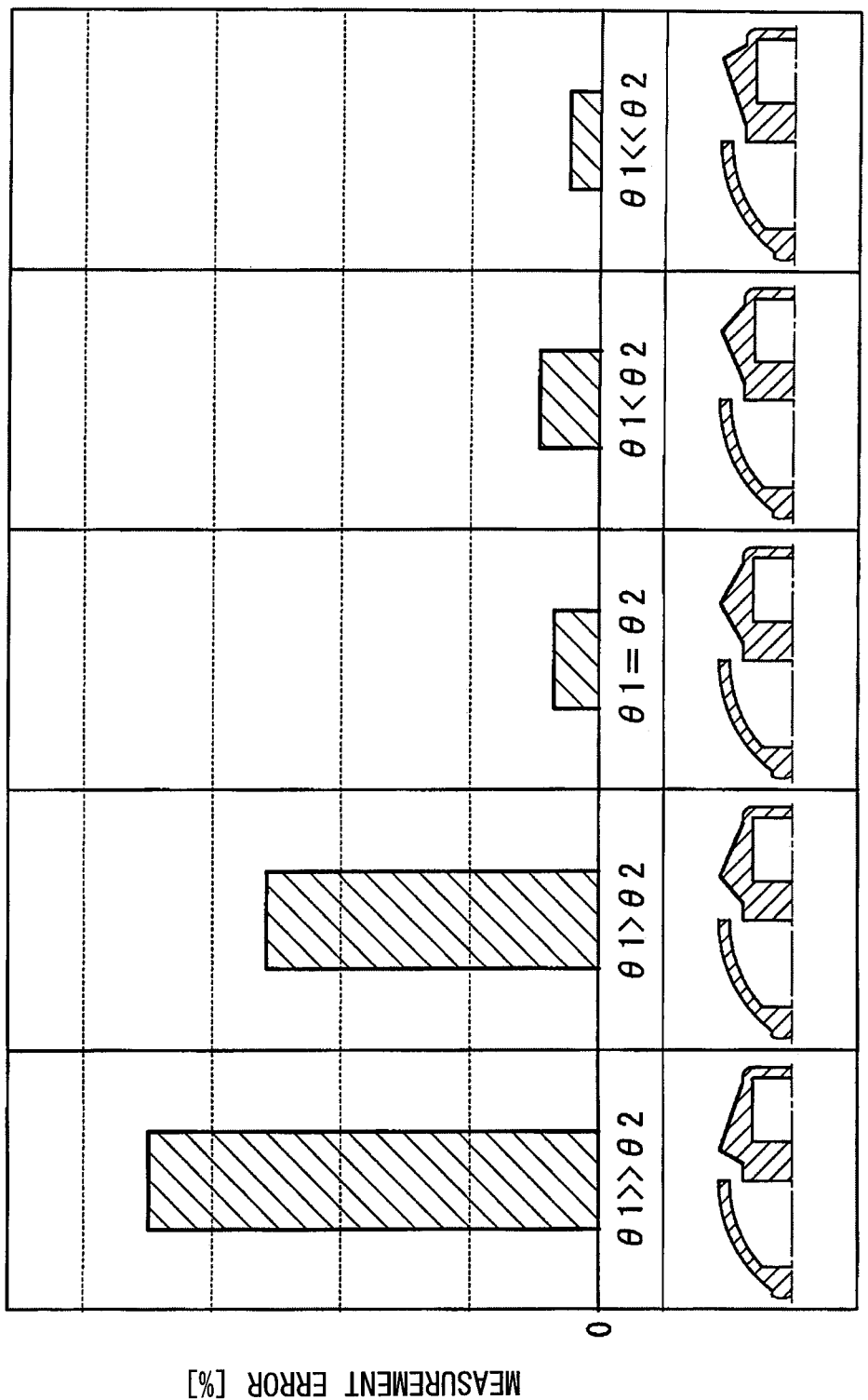
FIG. 4 is a bar chart indicating an evaluation result of a measurement error when changing a large/small relationship between angles θ1, θ2 according to the first embodiment.
Figure 5:
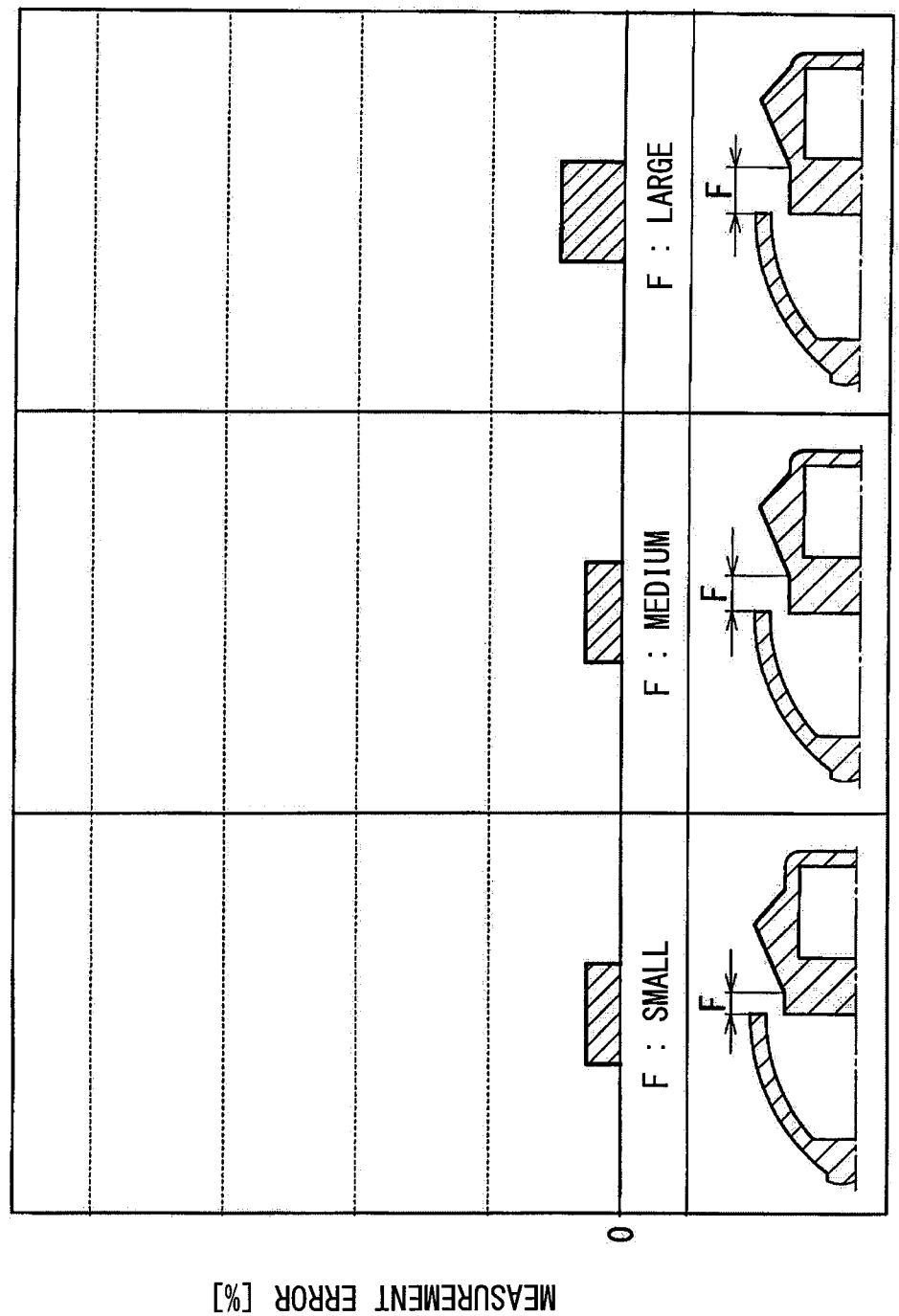
FIG. 5 is a bar chart indicating the evaluation result of the measurement error when changing a distance between an outlet and a protrusion according to the first embodiment.

Specifically, when the measurement error is examined with a large/small relationship between the angles θ1, θ2 changed in the range where the angles θ1, θ2 are smaller than 90 degrees as illustrated in FIG. 4, it can be found that the measurement error is much smaller at the time of the angle θ1 being equal to or smaller than the angle θ2 than at the time of the angle θ1 being larger than the angle θ2. It can also be found that, even though the distance F between the outlet 6 and the upstream end 24 is changed for the protrusion 21 that satisfies the relationship of θ1<θ2<90° as illustrated in FIG. 5, the measurement error maintains a small numerical value and hardly changes.

Second Embodiment

Figure 6:
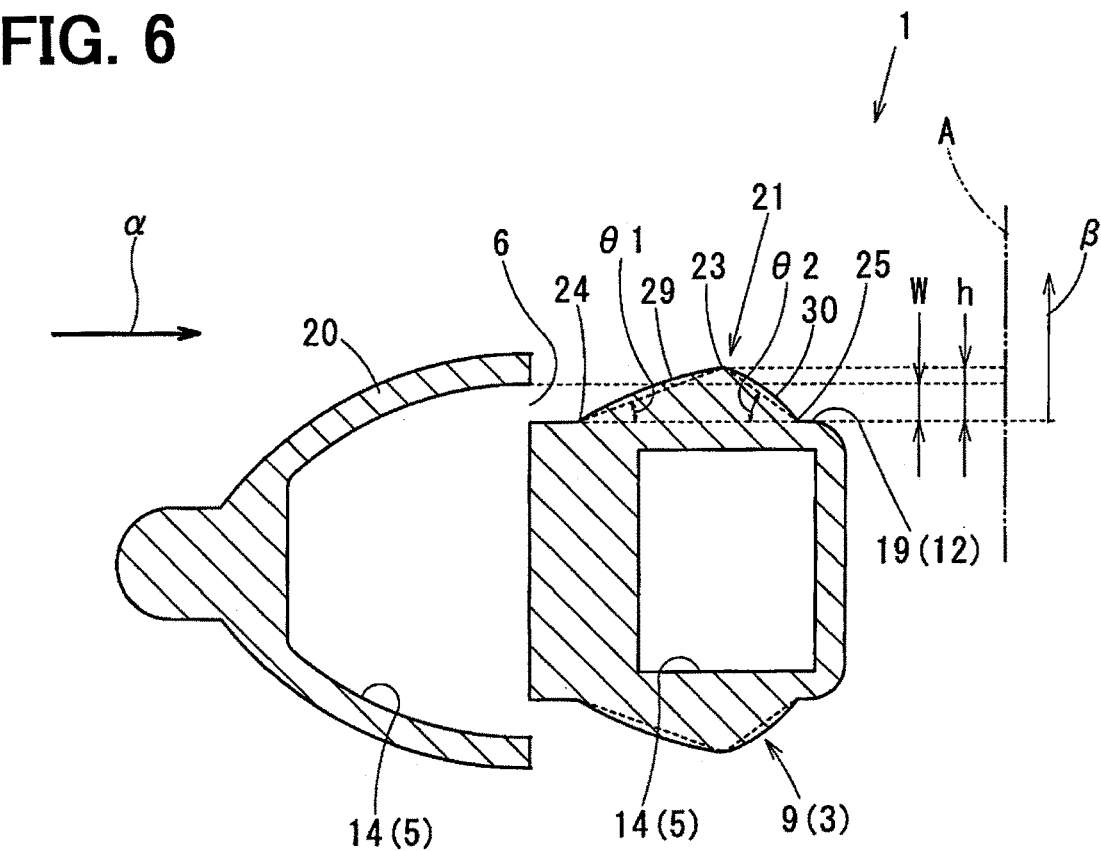
FIG. 6 is a cross-sectional view illustrating a main part of a flow measuring device in accordance with a second embodiment.

Similar to the protrusion 21 of the first embodiment, a protrusion 21 of a flow measuring device 1 of a second embodiment has a linear shape parallel to the longitudinal direction α, and a top 23, an upstream end 24, and a downstream end 25 of the protrusion 21 are lines parallel to the longitudinal direction α. Unlike the protrusion 21 of the first embodiment, curved surfaces 29, 30 projecting in the protruding direction β are located respectively between the upstream end 24 and the top 23, and between the downstream end 25 and the top 23 of the protrusion 21 of the second embodiment as illustrated in FIG. 6. The curved surfaces 29, 30 are smoothly continuous at the top 23. Similar to the first embodiment, the relationship of θ1<θ2<90° is satisfied for the angles θ1, θ2. This can achieve operation and effects similar to the first embodiment.

Third Embodiment

Figure 7:
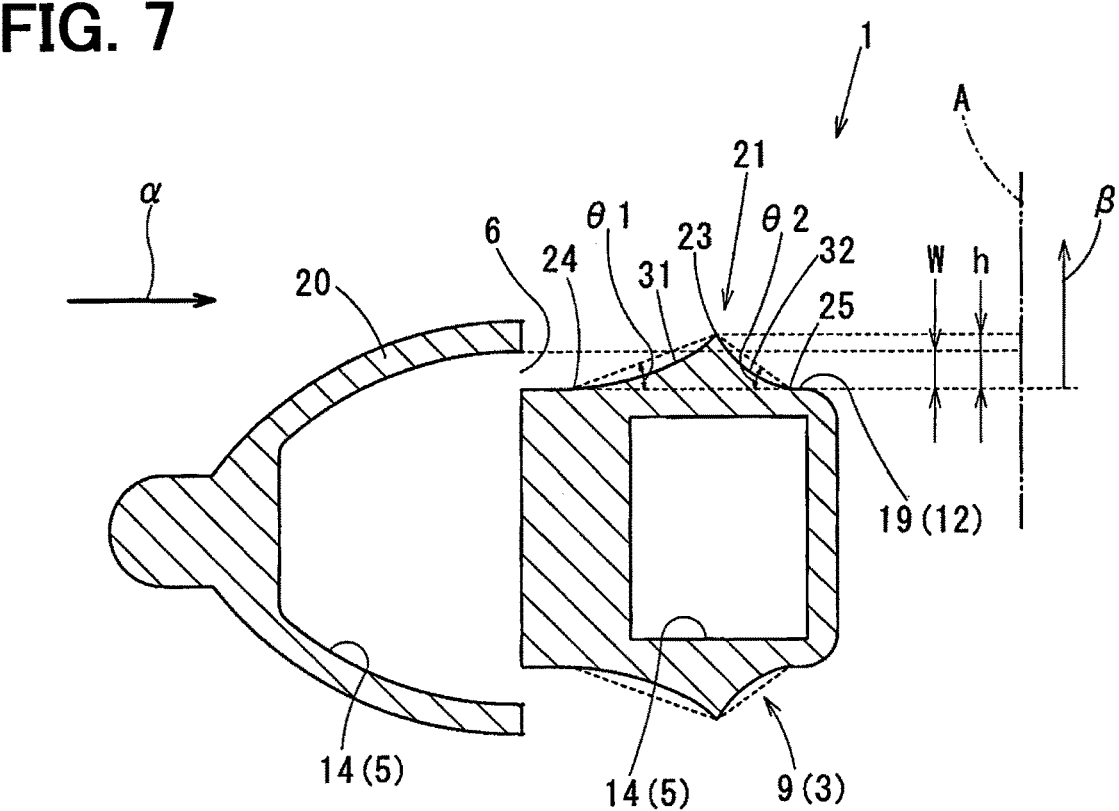
FIG. 7 is a cross-sectional view illustrating a main part of a flow measuring device in accordance with a third embodiment.

Similar to the protrusion 21 of the first embodiment, a protrusion 21 of a flow measuring device 1 of a third embodiment has a linear shape parallel to the longitudinal direction α, and a top 23, an upstream end 24, and a downstream end 25 of the protrusion 21 are lines parallel to the longitudinal direction α. Unlike the protrusion 21 of the first embodiment, curved surfaces 31, 32 recessed in the opposite direction from the protruding direction β are located respectively between the upstream end 24 and the top 23, and between the downstream end 25 and the top 23 of the protrusion 21 of the third embodiment as illustrated in FIG. 7. Similar to the first embodiment, the relationship of θ1<θ2<90° is satisfied for the angles θ1, θ2. This can achieve operation and effects similar to the first embodiment.

Fourth Embodiment

Figure 8:
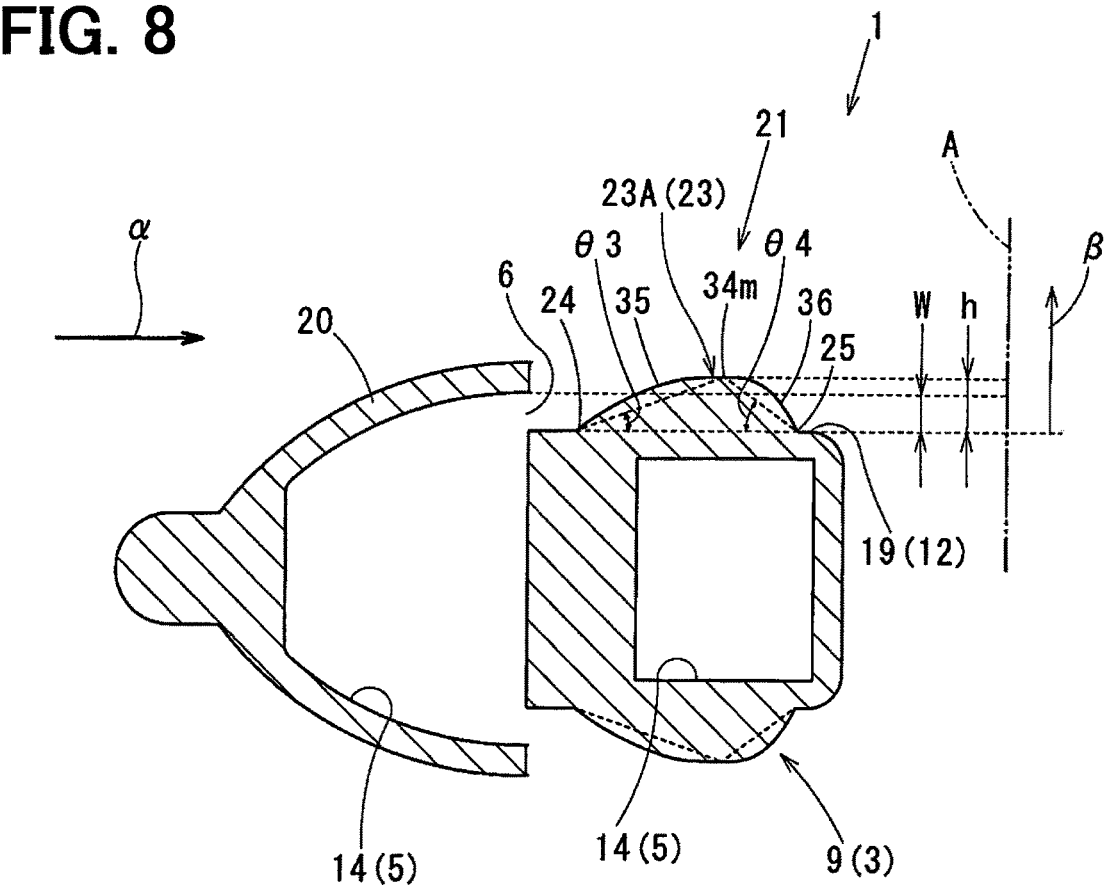
FIG. 8 is a cross-sectional view illustrating a main part of a flow measuring device in accordance with a fourth embodiment.

Similar to the protrusion 21 of the first embodiment, a protrusion 21 of a flow measuring device 1 of a fourth embodiment has a linear shape parallel to the longitudinal direction α, and an upstream end 24 and a downstream end 25 of the protrusion 21 are lines parallel to the longitudinal direction α. Unlike the protrusion 21 of the first embodiment, a top 23 of the protrusion 21 of the fourth embodiment is a top surface 23A that is flat and parallel to a flat surface 19 as illustrated in FIG. 8. Thus, the top surface 23A is a line segment on the particular cross section B of the protrusion 21.

With respect to the upstream end 24, the downstream end 25, and the midpoint 34m of the line segment, on the assumption of the angle θ3 that is formed between the direction from the upstream end 24 to the midpoint 34m and the reference direction α, and the angle θ4 that is formed between the direction from the downstream end 25 to the midpoint 34m and the reference direction α, a relationship of θ3<θ4<90° is satisfied. This can achieve operation and effects similar to the first embodiment. In addition, curved surfaces 35, 36 projecting in the protruding direction β are located respectively between the upstream end 24 and the top surface 23A and between the downstream end 25 and the top surface 23A. The curved surfaces 35, 36 are smoothly continuous with the top surface 23A respectively at the upstream end and the downstream end of the top surface 23A.

Fifth Embodiment

Figure 10:
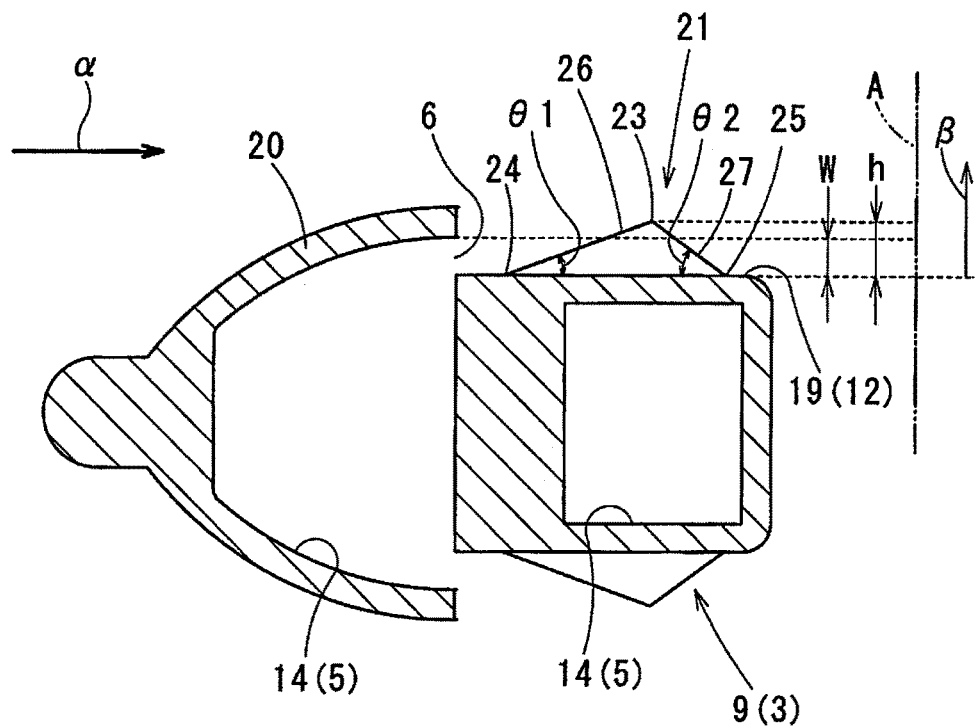
FIG. 10 is a cross-sectional view taken along a line X-X in FIG. 9A, illustrating a main part of the flow measuring device of the fifth embodiment.
Figure 9A:
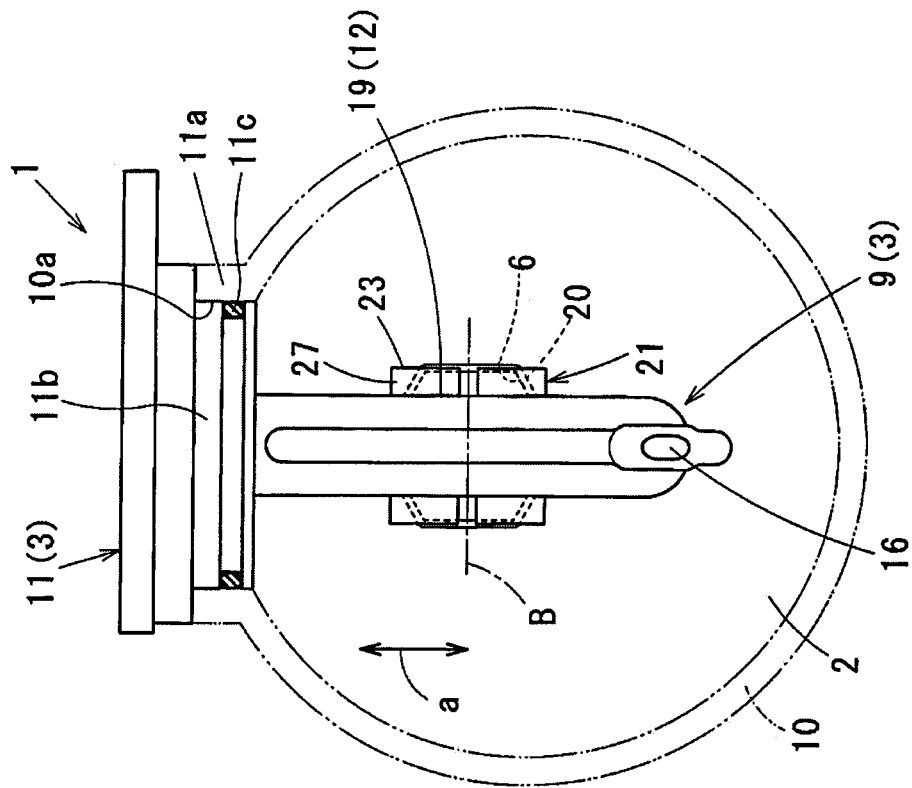
FIG. 9A is a side view illustrating a flow measuring device in accordance with a fifth embodiment.
Figure 9B:
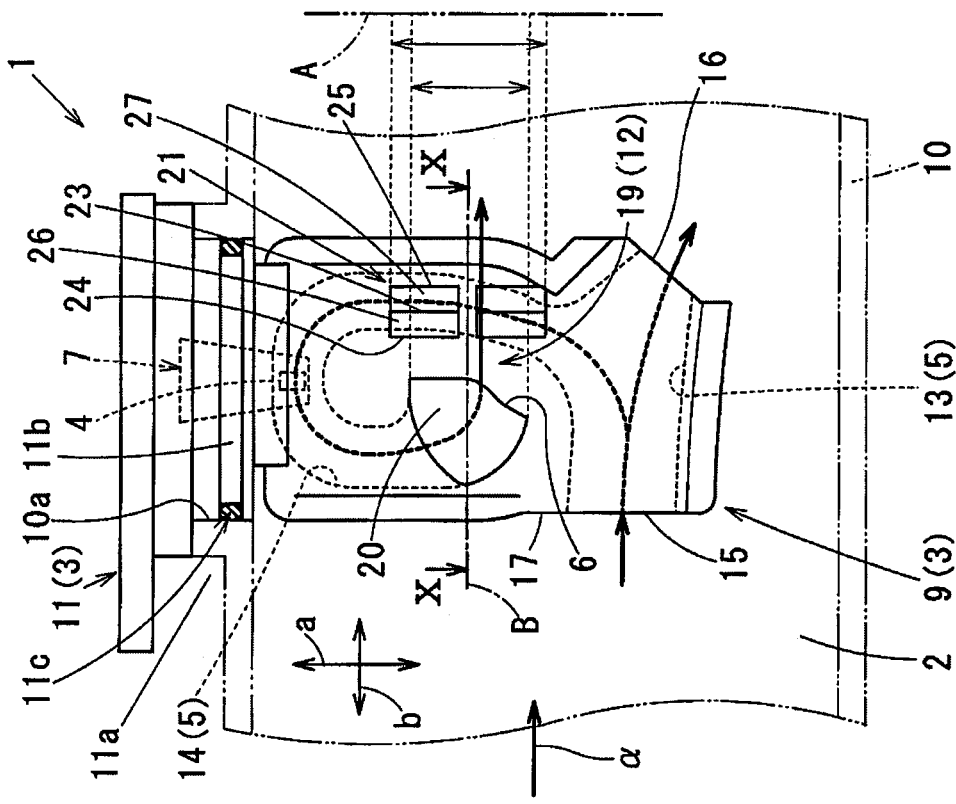
FIG. 9B is a rear view illustrating the flow measuring device of the fifth embodiment.

A protrusion 21 of a flow measuring device 1 of a fifth embodiment has a similar shape to the protrusion 21 of the first embodiment. Unlike the protrusion 21 of the first embodiment, two protrusions 21 exist in the fifth embodiment as illustrated in FIGS. 9A to 10. The length of each protrusion 21 in the longitudinal direction α is shorter than the protrusion 21 of the first embodiment. The two protrusions 21 are arranged side by side in the longitudinal direction α. Thus, the configuration of the protrusions 21 of the fifth embodiment has such an aspect that the protrusion 21 of the first embodiment is divided down the middle in the longitudinal direction α. This can achieve operation and effects similar to the first embodiment.

Sixth Embodiment

Figure 11:
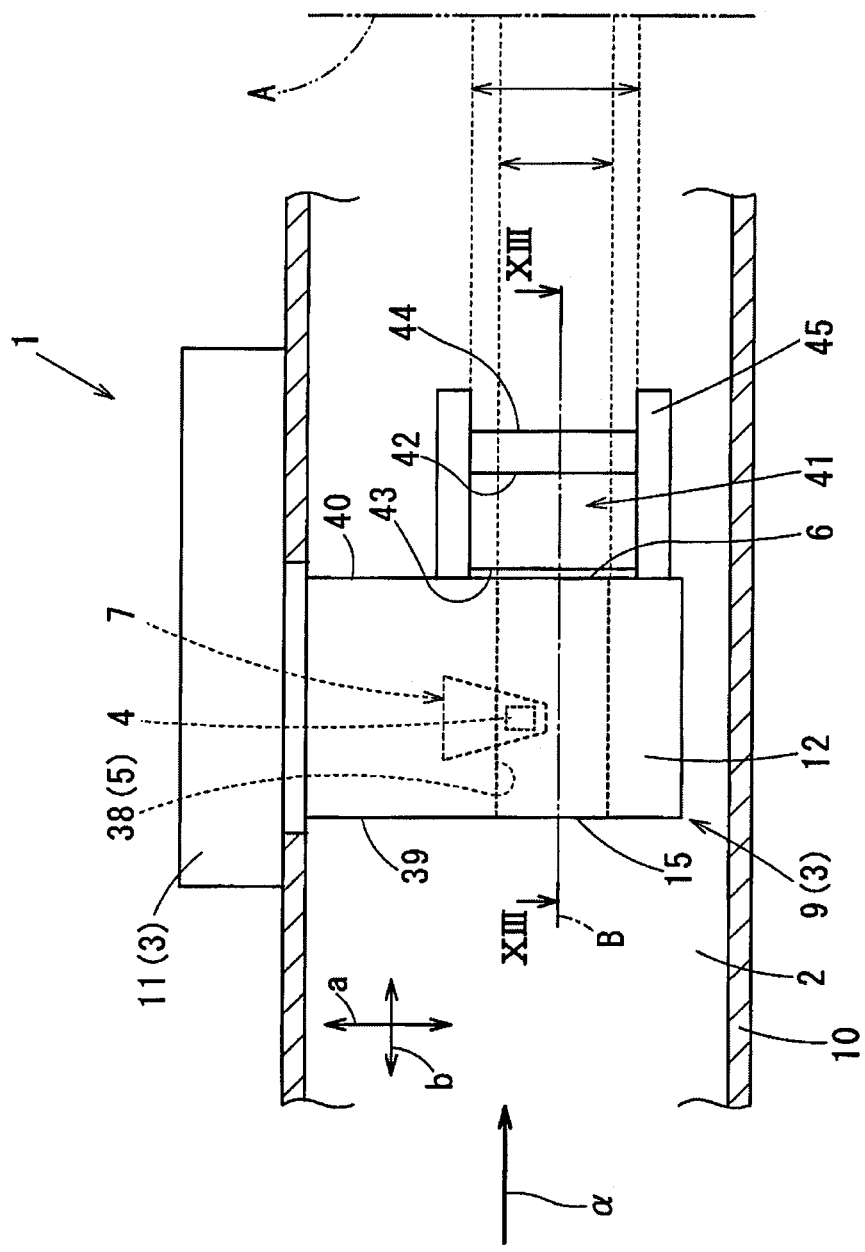
FIG. 11 is a side view illustrating a flow measuring device in accordance with a sixth embodiment.
Figure 12A:
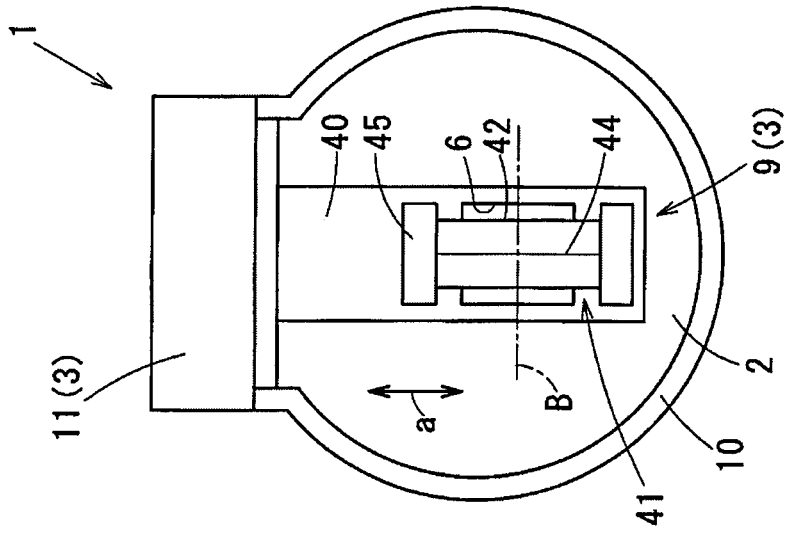
FIG. 12A is a front view illustrating the flow measuring device of the sixth embodiment.
Figure 12B:
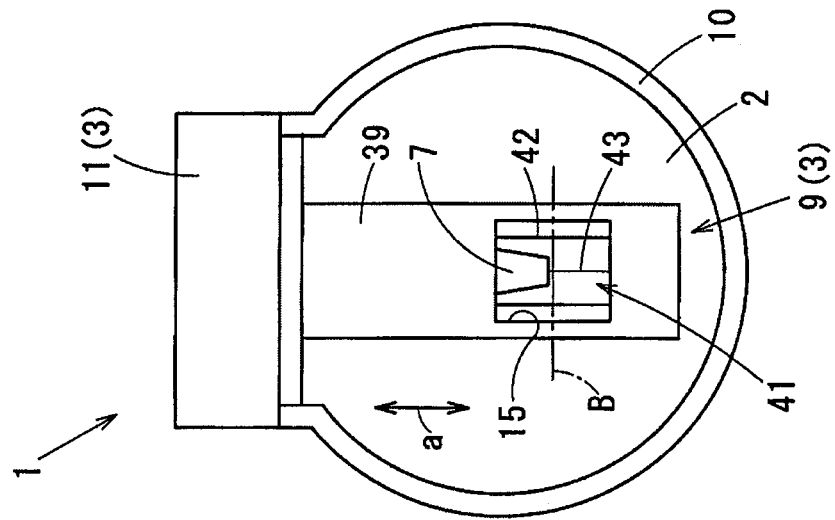
FIG. 12B is a rear view illustrating the flow measuring device of the sixth embodiment.
Figure 13:
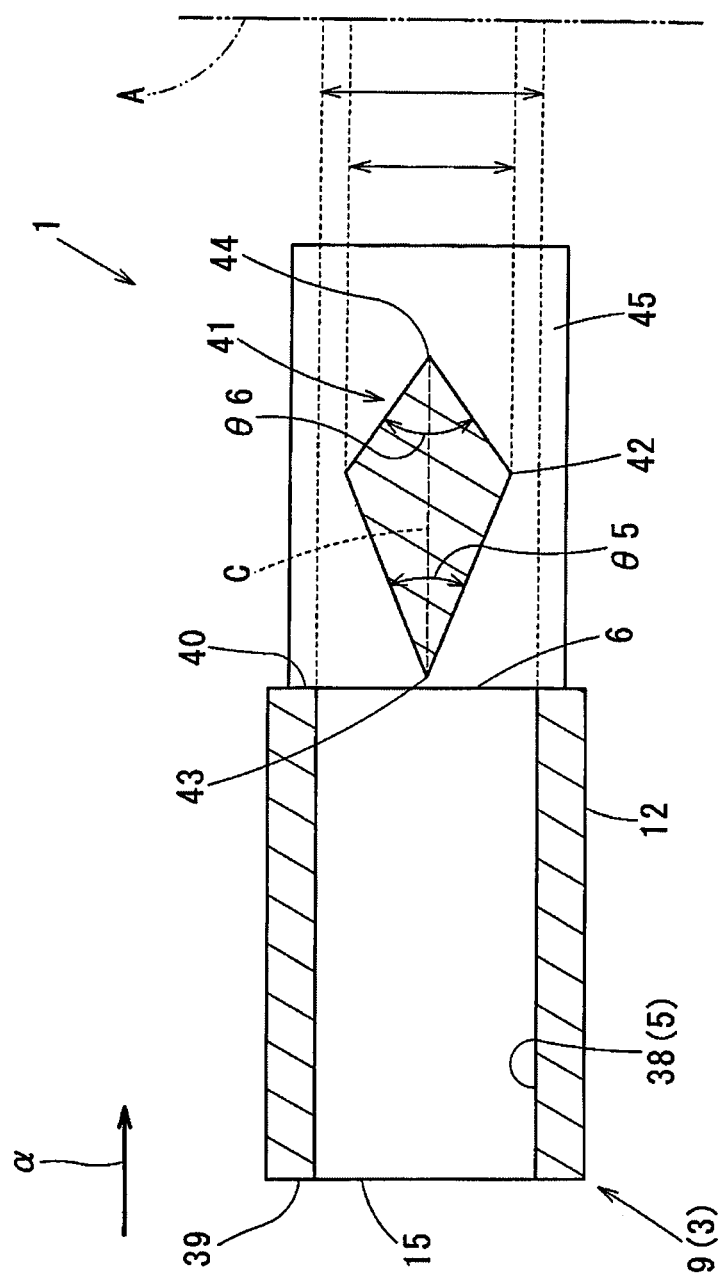
FIG. 13 is a cross-sectional view taken along a line XIII-XIII in FIG. 11, illustrating a main part of the flow measuring device according to the sixth embodiment.

Similar to the first embodiment, a passage forming part 9 of a flow measuring device 1 of a sixth embodiment is shaped into a generally rectangular parallelepiped with its outer shape rectangular and plate-like, and projects into a main passage 2 such that its short direction b is parallel to the reference direction α as illustrated in FIGS. 11 to 13. A sub passage 5 is a straight passage 38 passing through straight between an inlet 15 and an outlet 6 parallel to the short direction b, and a flow sensor 4 projects into the straight passage 38. The outlet 6 and the inlet 15 have the same rectangular shape that is long in the longitudinal direction α, and overlap with each other when projected onto the projection plane A perpendicular to the reference direction α.

The inlet 15 opens toward the upstream side on a long narrow end surface 39 that is located on the upstream side in the reference direction α, and the outlet 6 opens toward the downstream side on an end surface 40 on the opposite side from the end surface 39 in the reference direction α. The flow direction of intake air in the straight passage 38 is the same as the reference direction α both at the time of a forward flow and at the time of a backward flow.

Consequently, the flow measuring device 1 of the sixth embodiment can measure a flow rate at the time of a backward flow as well as a flow rate in the main passage 2 at the time of a forward flow, similar to the first embodiment. Based on the flow rates both at the time of a forward flow and at the time of a backward flow, the ECU can obtain the amount of intake air taken into the internal-combustion engine.

A housing 3 of the flow measuring device 1 of the sixth embodiment includes a pillar body 41 that is disposed on a downstream side of the outlet 6. The pillar body 41 is a square pillar extending parallel to the longitudinal direction α. The pillar body 41 includes two tops 42 projecting perpendicularly to the reference direction α, an upstream end 43 projecting toward the upstream side, and a downstream end 44 projecting toward the downstream side. The two tops 42, the upstream end 43, and the downstream end 44 are line segments parallel to the longitudinal direction α. When the pillar body 41 and the outlet 6 are projected onto the projection plane A, the outlet 6 and the pillar body 41 partly overlap with each other on the projection plane A. More specifically, on the projection plane A, the outlet 6 and the pillar body 41 generally correspond with regard to the range in the longitudinal direction α, and the pillar body 41 is included in the outlet 6 with regard to the range in the direction in which the top 42 projects.

On the particular cross section B of the cross section of the pillar body 41 perpendicular to the longitudinal direction α, on the assumption of the angle θ5 that is formed by the two tops 42 and the upstream end 43, and the angle θ6 that is formed by the two tops 42 and the downstream end 44, a relationship of θ5<θ6<90° is satisfied. This can achieve operation and effects similar to the first embodiment. The pillar body 41 is supported by two supporting parts 45 that extend from the end surface 40 to the downstream side in the reference direction α. On the assumption of a separate section C including the upstream end 43 and the downstream end 44 separately from the particular cross section B, the pillar body 41 is plane-symmetrical with the separate section C as a symmetry plane, and the two tops 42 are located at the same position in the reference direction α.

Seventh Embodiment

Figure 14:
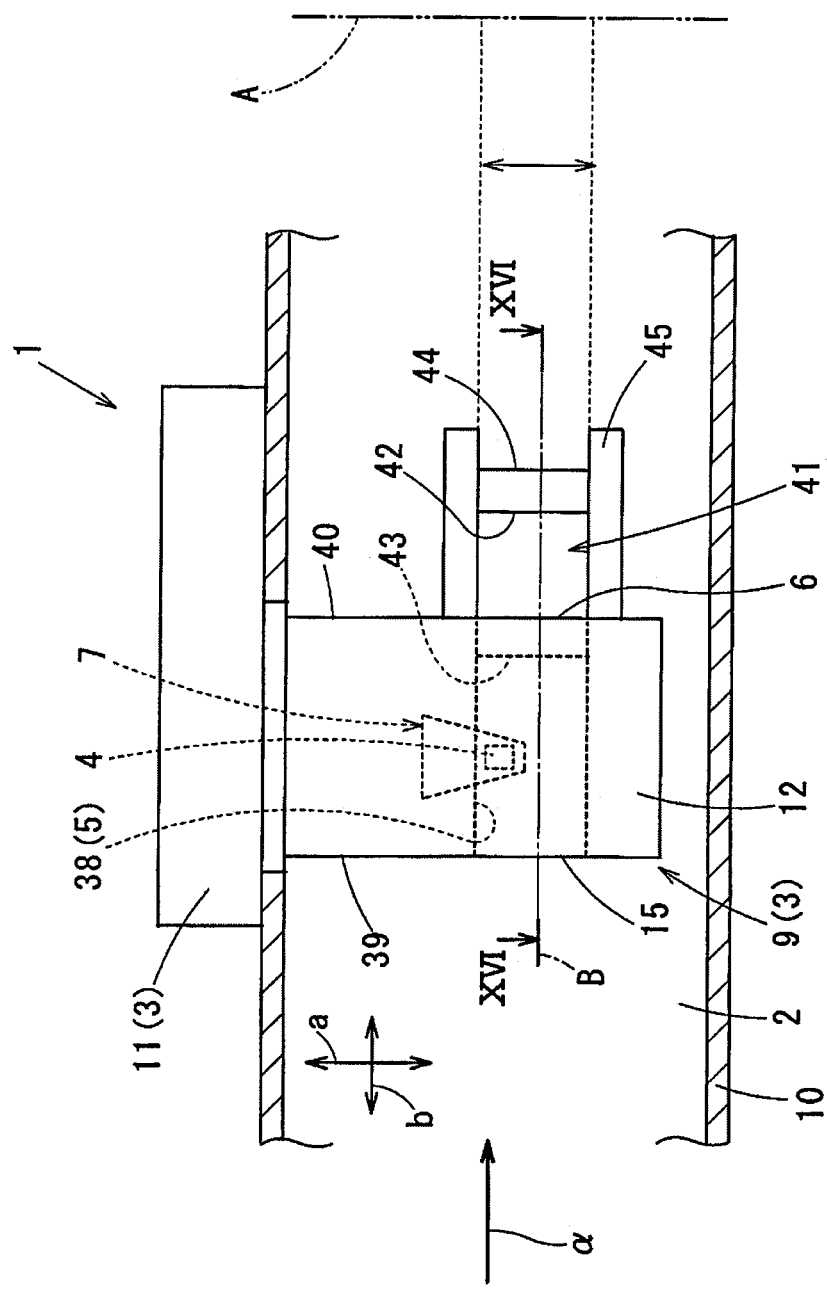
FIG. 14 is a side view illustrating a flow measuring device in accordance with a seventh embodiment.
Figure 15A:
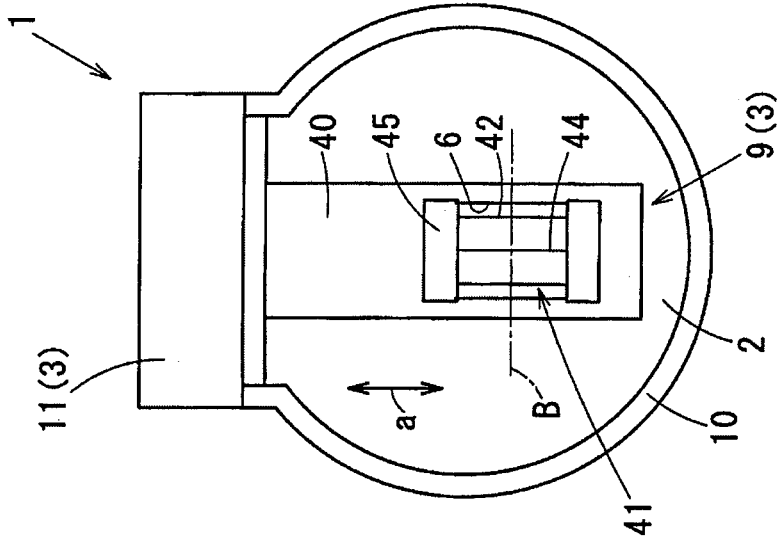
FIG. 15A is a front view illustrating the flow measuring device of the seventh embodiment.
Figure 15B:
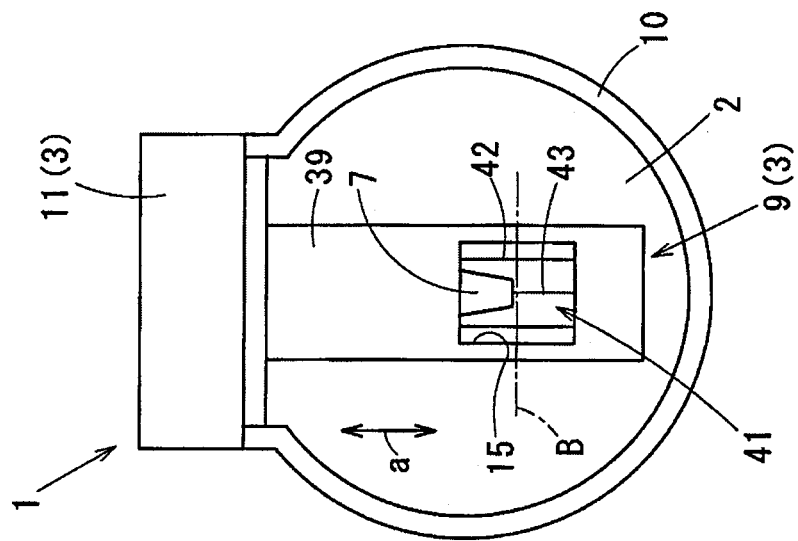
FIG. 15B is a rear view illustrating the flow measuring device of the seventh embodiment.
Figure 16:
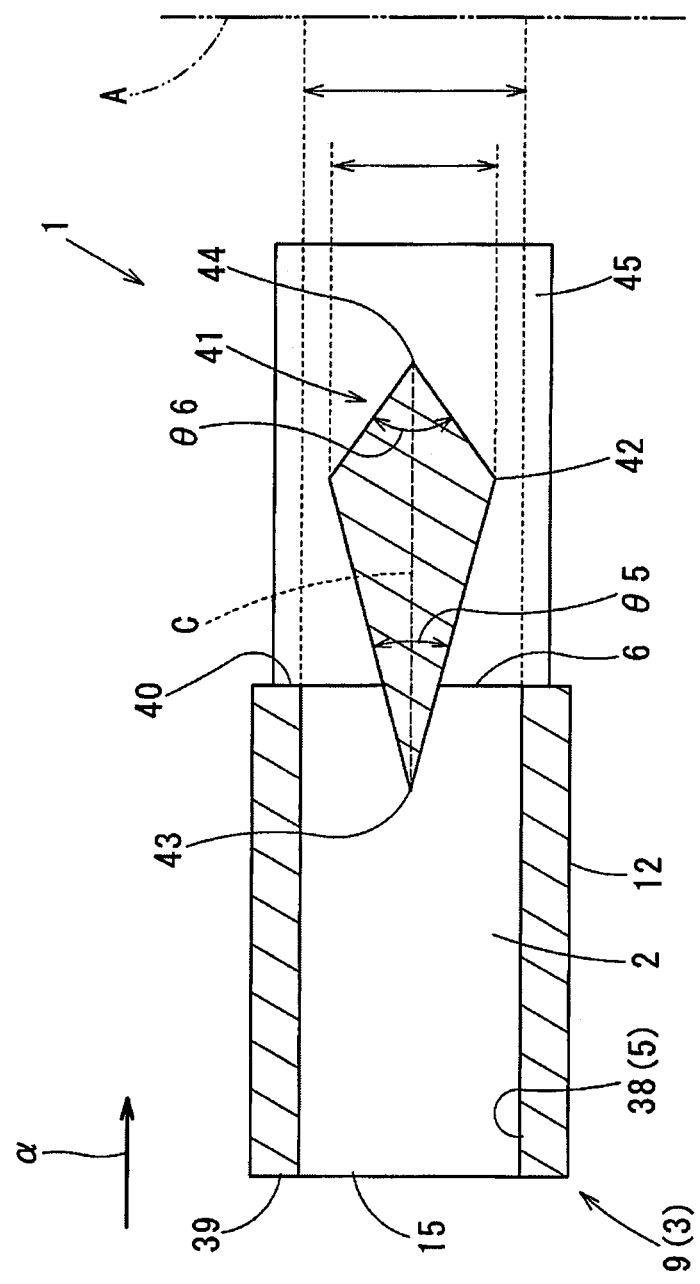
FIG. 16 is a cross-sectional view taken along a line XVI-XVI in FIG. 14, illustrating a main part of the flow measuring device according to the seventh embodiment.

As illustrated in FIGS. 14 to 16, a housing 3, a sub passage 5, and a pillar body 41 of a flow measuring device 1 of a seventh embodiment have the same shapes as the housing 3, the sub passage 5, and the pillar body 41 of the sixth embodiment, respectively. The pillar body 41 of the seventh embodiment exists partly in the sub passage 5. Specifically the part of the pillar body 41 on an upstream side of two tops 42 in the reference direction α has a portion including an upstream end 43, which is located in the sub passage 5. Consequently, similar operation and effects to the first embodiment can be achieved.

Eighth Embodiment

Figure 17:
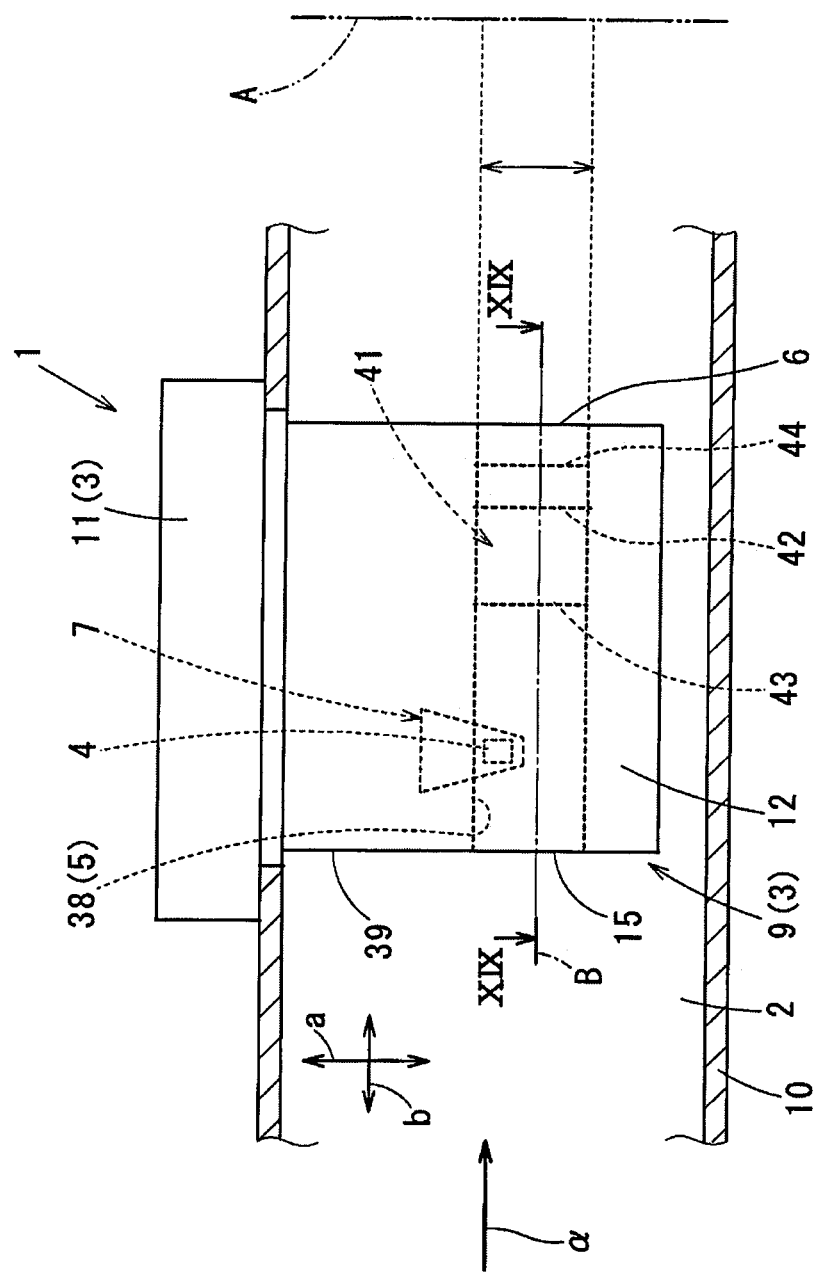
FIG. 17 is a side view illustrating a flow measuring device in accordance with an eighth embodiment.
Figure 18A:
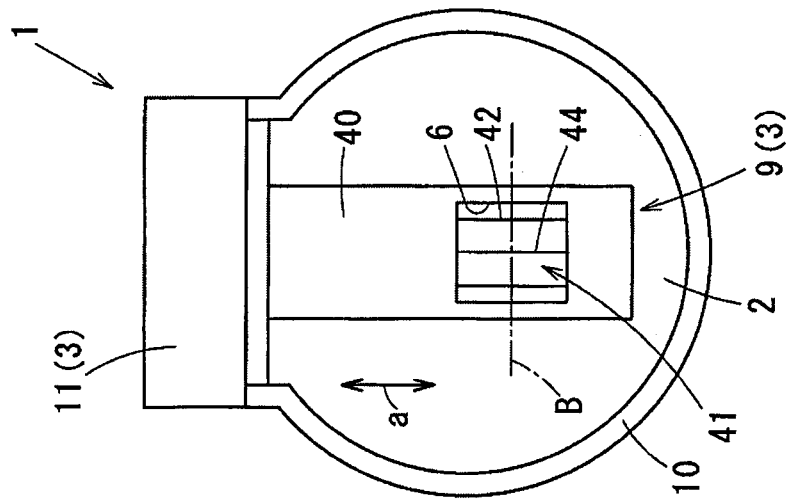
FIG. 18A is a front view illustrating the flow measuring device of the eighth embodiment.
Figure 18B:
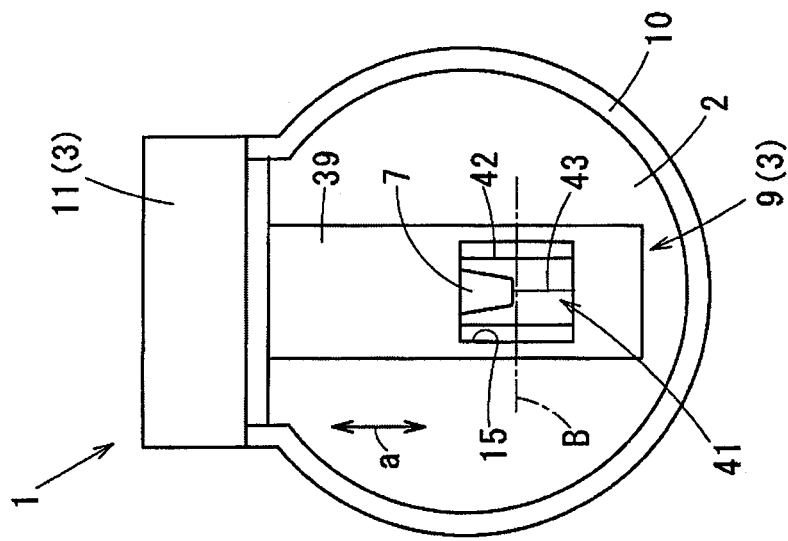
FIG. 18B is a rear view illustrating the flow measuring device of the eighth embodiment.
Figure 19:
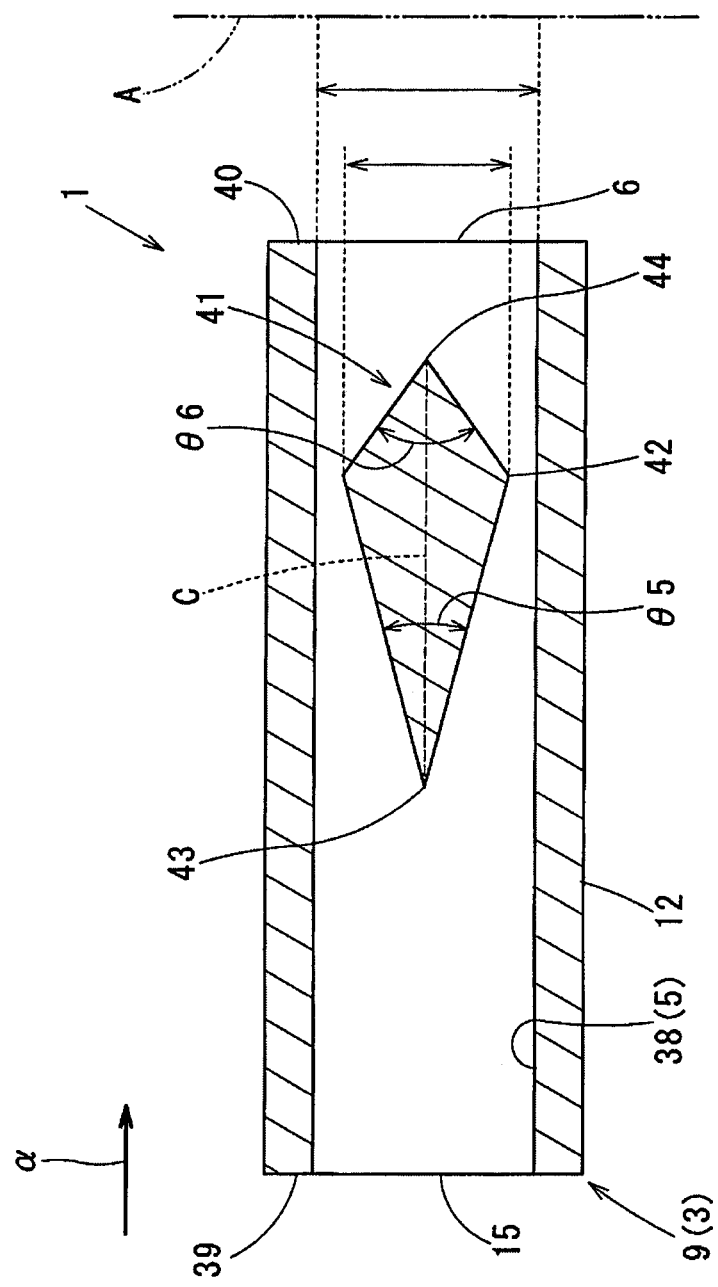
FIG. 19 is a cross-sectional view taken along a line XIX-XIX in FIG. 17, illustrating a main part of the flow measuring device of the eighth embodiment.
Figure 20:
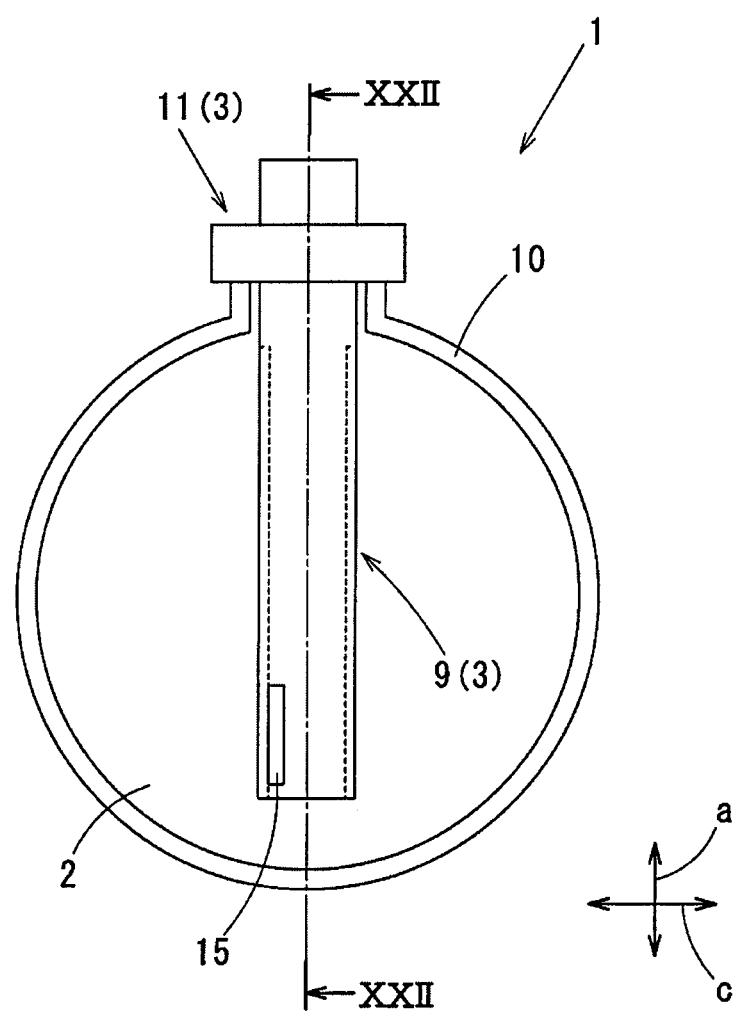
FIG. 20 is a front view illustrating a flow measuring device in accordance with a ninth embodiment.
Figure 21:
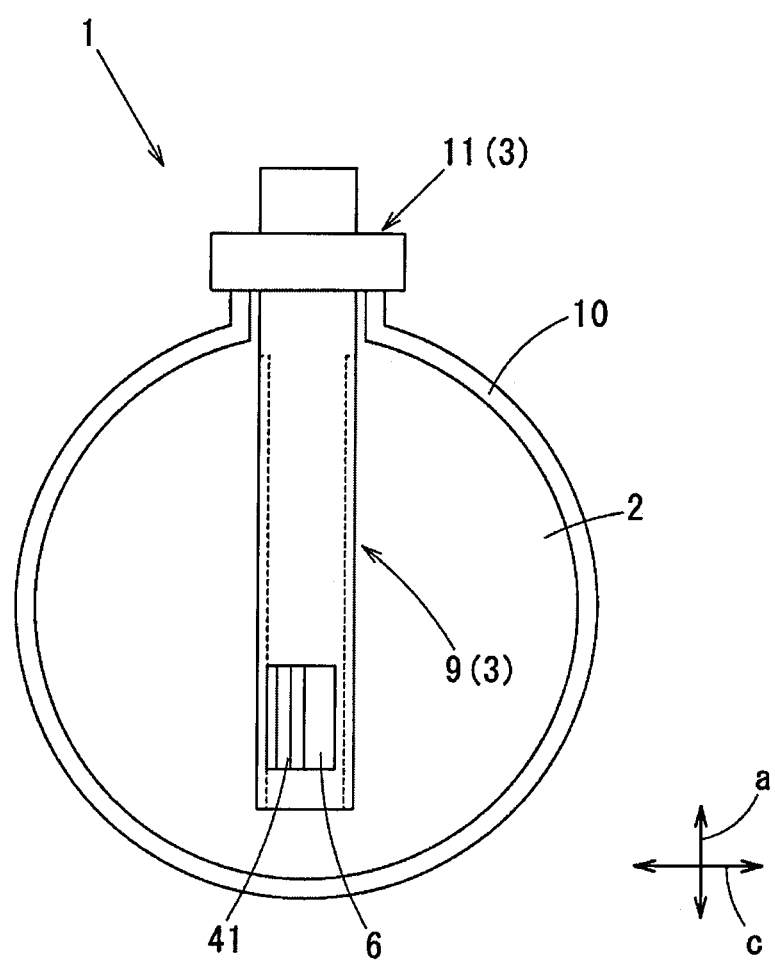
FIG. 21 is a rear view illustrating the flow measuring device of the ninth embodiment.
Figure 22:
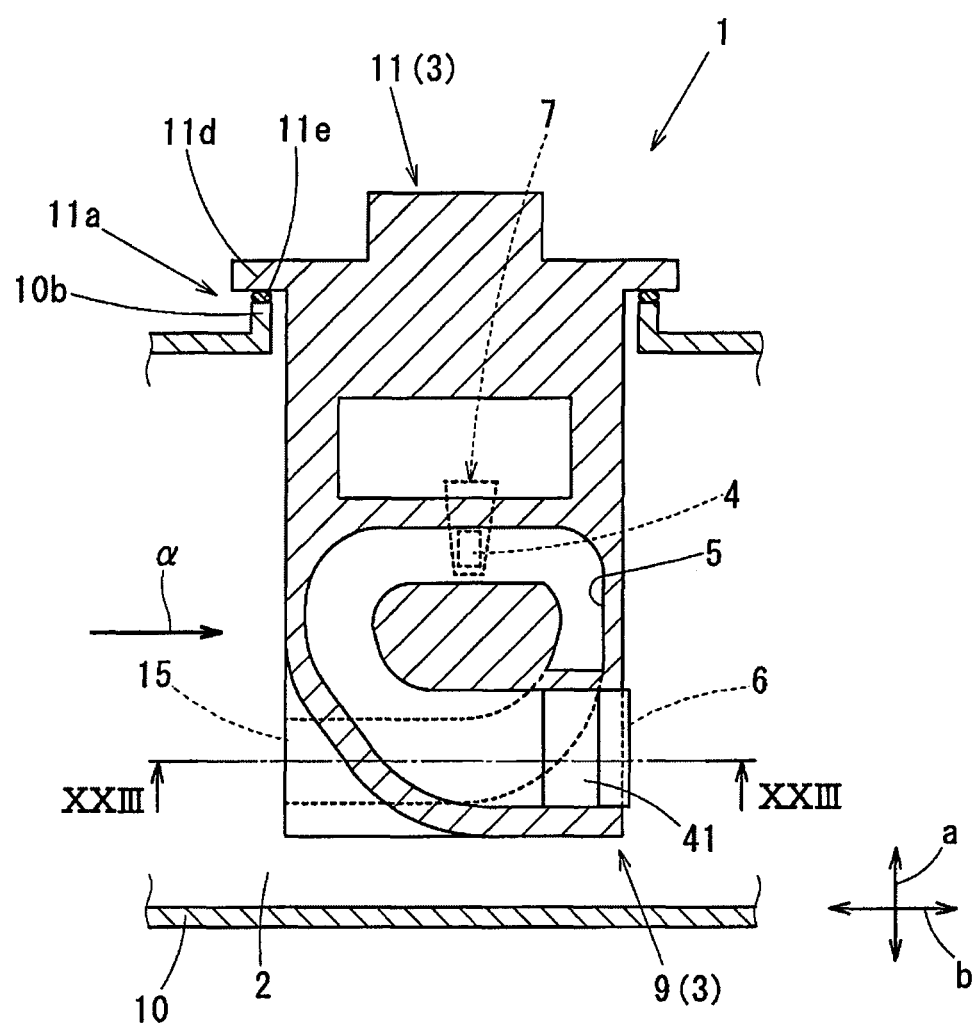
FIG. 22 is a sectional view taken along a line XXII-XXII in FIG. 20 according to the ninth embodiment.

As illustrated in FIGS. 17 to 19, a housing 3, a sub passage 5, and a pillar body 41 of a flow measuring device 1 of an eighth embodiment have the same shapes as the housing 3, the sub passage 5, and the pillar body 41 of the sixth embodiment, respectively. The entire pillar body 41 of the eighth embodiment exists in the sub passage 5. Consequently, similar operation and effects to the first embodiment can be achieved.

Ninth Embodiment

In a flow measuring device 1 of a ninth embodiment, a sub passage 5 is provided to rotate the entire flow of the taken-in intake air as illustrated in FIGS. 20 to 23. An outlet 6 and an inlet 15 have rectangular shapes that are long in the longitudinal direction α. When projected onto the projection plane A perpendicular to the reference direction α, the inlet 15 overlaps with the outlet 6 with the inlet 15 off-centered on one side of the outlet 6. Specifically, on the assumption of the third direction c that is perpendicular to both the longitudinal direction α and the short direction b, the inlet 15 exists off-centered on one side of the outlet 6 in the third direction c on the projection plane A (see FIGS. 20 and 21).

A housing 3 has a pillar body 41 having a shape similar to the sixth to eighth embodiments, and the pillar body 41 partly projects outward of the sub passage 5 from the outlet 6. Specifically, the part of the pillar body 41 on a downstream side of two tops 42 in the reference direction α has a portion including a downstream end 44, which is located outside the sub passage 5. The pillar body 41 exists off-centered on the other side of the outlet 6 in the third direction c. Consequently, similar operation and effects to the first embodiment can be achieved.

A hole 10a of the ninth embodiment has a rectangular shape, and the opening edge of the hole 10a protrudes evenly on the outer surface of a pipe 10 to form a rectangular tube 10b. An attached part 11 includes a flanged part 11d that can cover the end surface of the tube 10b. A rectangular ring 11e made from an elastic material such as rubber is mounted on the end surface of the tube 10b, and the ring 11e is clamped between the tube 10b and the flanged part 11d to constitute a sealing part 11a.

Figure 23:
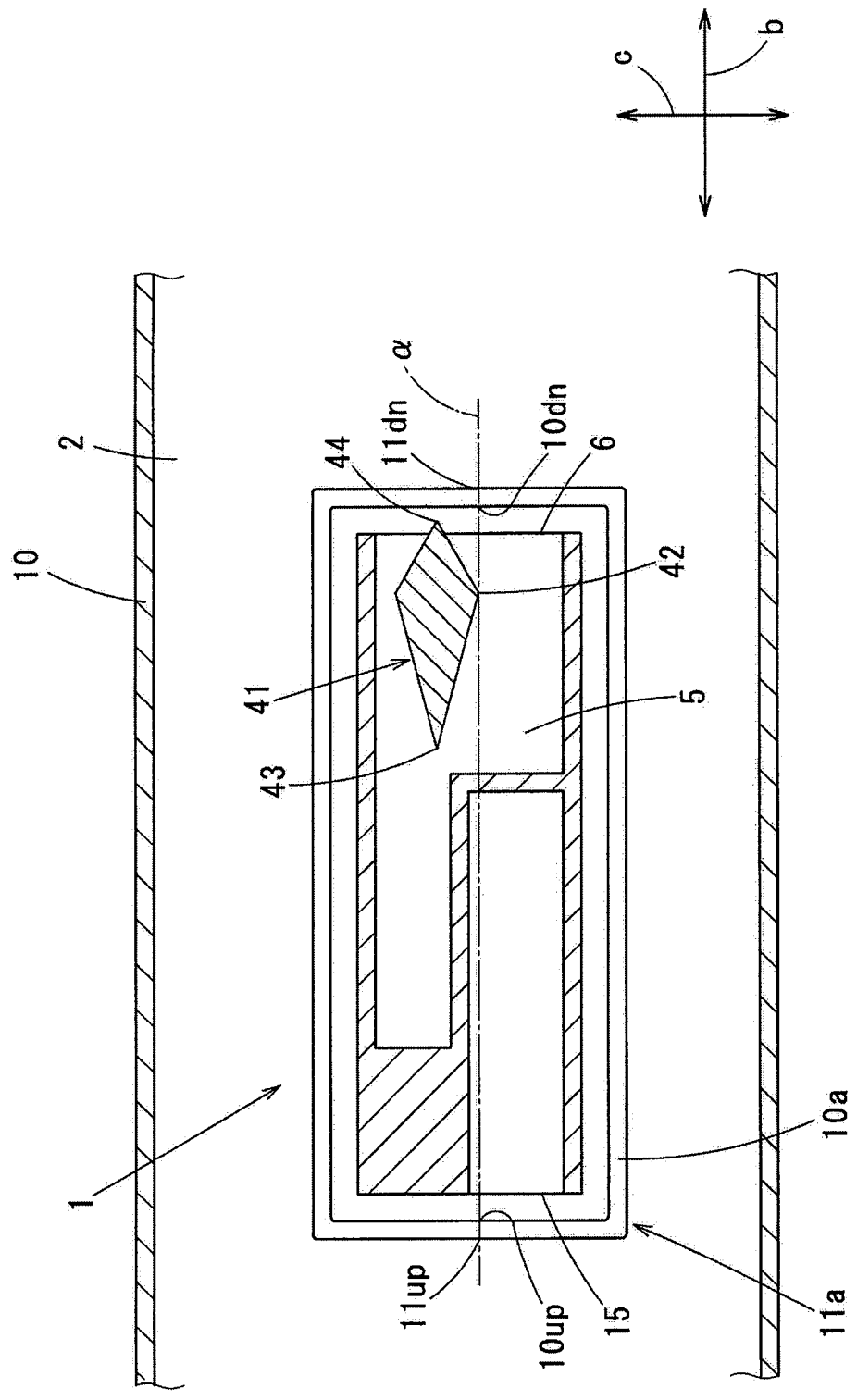
FIG. 23 is an explanatory diagram indicating a reference direction of the flow measuring device using a cross section taken along a line XXIII-XXIII in FIG. 22 according to the ninth embodiment.

In the ninth embodiment, an upstream end 11up and a downstream end 11dn of the sealing part 11a, and an upstream end 10up and a downstream end 10dn of the hole 10a are line segments as illustrated in FIG. 23. The reference direction α can be defined as the direction of the straight line connecting together the respective midpoints of the upstream end 11up and the downstream end 11dn. The reference direction α is the same direction as the direction of the straight line connecting together the respective midpoints of the upstream end 10up and the downstream end 10dn, and is the same direction as the direction of the flow passage axis in the region of a main passage 2 in which the flow measuring device 1 exists.

Modifications to the above embodiments will be described. The present disclosure can be variously modified without departing from the scope of the disclosure. Specifically, the mode of, for example, the housing 3, the passage forming part 9, the sub passage 5, the protrusion 21, and the pillar body 41 of the flow measuring device 1 is not limited to the embodiments, and various modes thereof are possible. The first to eighth embodiments illustrate the mode in which the flow measuring device 1 is disposed in the main passage 2 through which intake air flows to measure a flow rate of intake air drawn into the internal-combustion engine, but the use mode of the flow measuring device 1 is not limited to this mode.

Figure 24:
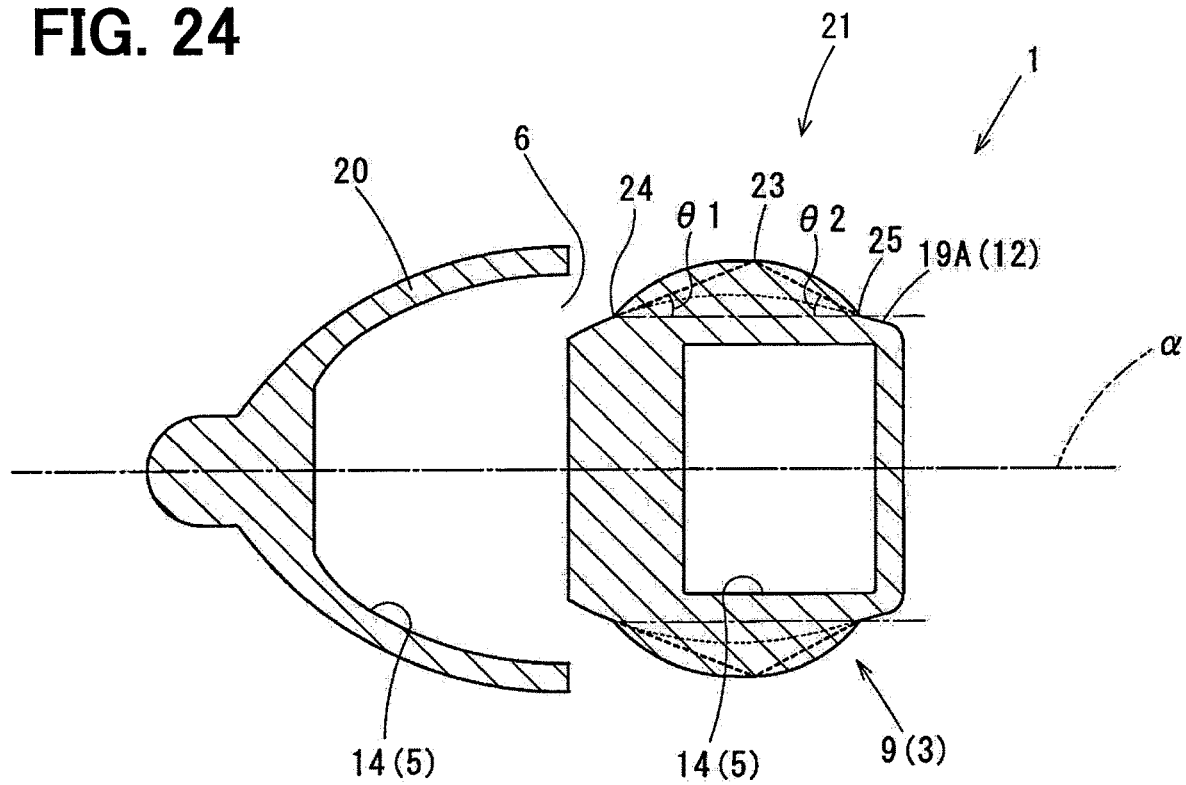
FIG. 24 is a cross-sectional view illustrating a main part of a flow measuring device according to a modification.
Figure 25:
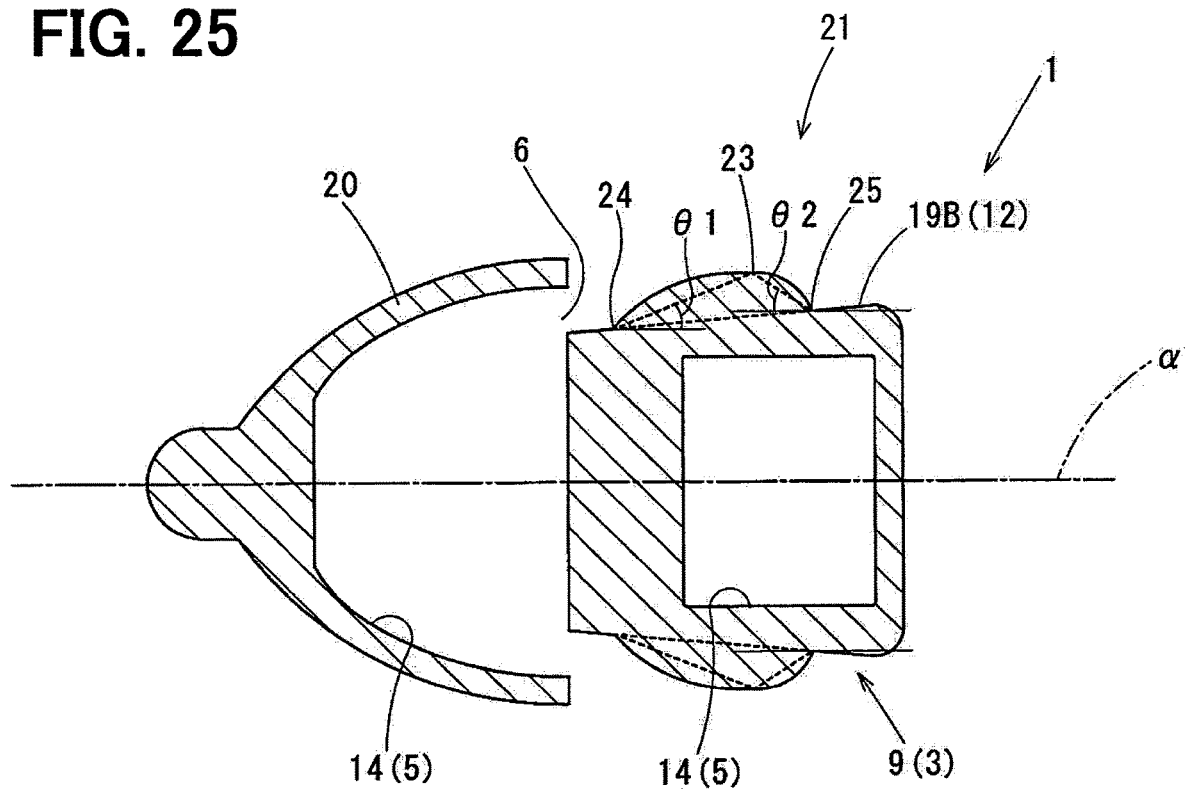
FIG. 25 is a cross-sectional view illustrating a main part of a flow measuring device according to a modification.
Figure 26:
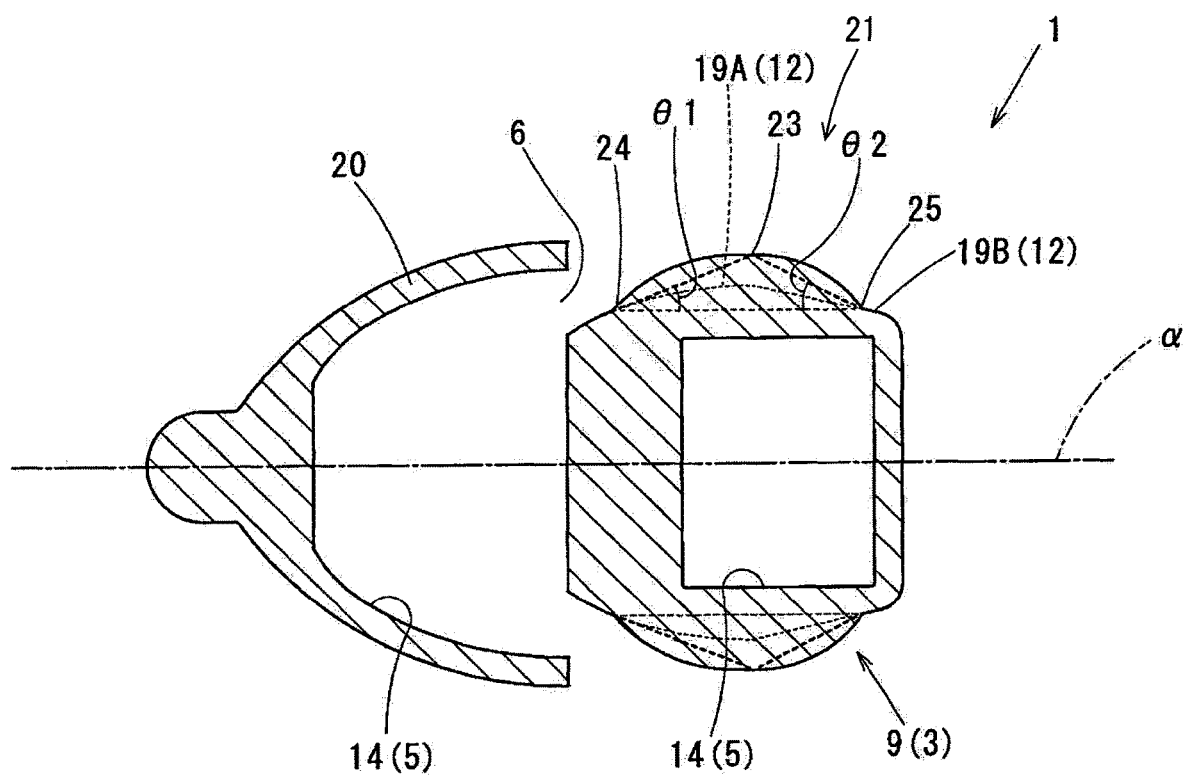
FIG. 26 is a cross-sectional view illustrating a main part of a flow measuring device according to a modification.

In the flow measuring device 1 of the first to fifth embodiments, the protrusion 21 is located on the flat surface 19 parallel to the reference direction α, but the surface on which the protrusion 21 exists is not limited to this mode. For example, the outer wall on a downstream side of the outlet 6 is configured as a curved surface 19A, and the protrusion 21 may be provided on the curved surface 19A (see FIG. 24). The outer wall on a downstream side of the outlet 6 is configured as an inclined surface 19B that is inclined relative to the reference direction α, and the protrusion 21 may be provided on the inclined surface 19B (see FIG. 25). In addition, the outer wall on a downstream side of the outlet 6 is configured by two surfaces: the curved surface 19A and the inclined surface 19B, and the protrusion 21 may be provided to overstride both the curved surface 19A and the inclined surface 19B (see FIG. 26).

In the flow measuring device 1 of the embodiments, the sealing part 11a seals the part between the main passage 2 and the outside of the pipe 10 substantially with the O-ring 11c or the ring 11e, but the mode of sealing by the sealing part 11a is not limited to this mode. For example, by welding together the tube 10b and the flanged part 11d in the flow measuring device 1 of the ninth embodiment, the sealing part 11a is configured to seal the part between the main passage 2 and the outside of the pipe 10.

Characteristics of the flow measuring device 1 of the above embodiments can be described as follows.

A flow measuring device 1 in a first aspect of the present disclosure is adapted to be inserted in a main passage 2 through a hole 10a, which is provided at a pipe 10 defining the main passage 2, and to be fixed to the pipe 10. The flow measuring device 1 generates a signal in accordance with a flow rate of measured gas in the main passage 2 and includes: a housing 3 that includes a sub passage 5, through which measured gas flowing in the main passage 2 is taken in to flow, and that is inserted in the main passage 2, the housing 3 including a sealing part 11a that prevents a leak of measured gas at the hole 10a; and a flow sensor 4 that is disposed in the sub passage 5 to generate the signal in accordance with the flow rate of measured gas flowing in the main passage 2 by heat transfer between the flow sensor 4 and measured gas flowing through the sub passage 5. A direction connecting an upstream end 11up and a downstream end 11dn of the sealing part 11a is defined as a reference direction α.

An outlet 6 of the sub passage 5 that returns measured gas, which has passed through the flow sensor 4, from the sub passage 5 to the main passage 2 opens on an outer wall of the housing 3 toward a downstream side in the reference direction α. The outer wall of the housing 3 includes a protrusion 21 on the downstream side of the outlet 6. When the outlet 6 and the protrusion 21 are projected onto a projection plane A perpendicular to the reference direction α, the outlet 6 and the protrusion 21 partly overlap with each other on the projection plane A. With regard to an upstream end 24, a downstream end 25, and a top 23 of the protrusion 21, a relationship of $\theta1<\theta2<90°$ is satisfied, where: $\theta1$ is assumed to be an angle formed between a direction from the upstream end 24 to the top 23, and the reference direction α; and $\theta2$ is assumed to be an angle formed between a direction from the downstream end 25 to the top 23, and the reference direction α.

This can restrict the occurrence of a flow separation near the top 23 of the protrusion 21 at the time of a backward flow. Thus, an insufficient state of the amount of measured gas flowing into the sub passage 5 at the time of a backward flow can be eliminated, to restrict the reduction of measurement accuracy of the flow measuring device 1.

In the flow measuring device 1 in a second aspect of the present disclosure, a top of the protrusion 21 is a flat top surface 23A. The top surface 23A is a line segment on a cross section that is drawn to be parallel to the reference direction α and to cut the top surface 23A. With regard to an upstream end 24 and a downstream end 25 of the protrusion 21, and a midpoint 34m of the line segment, a relationship of $\theta3<\theta4<90°$ is satisfied, where: $\theta3$ is assumed to be an angle formed between a direction from the upstream end 24 to the midpoint 34m of the line segment, and the reference direction α; and $\theta4$ is assumed to be an angle formed between a direction from the downstream end 25 to the midpoint 34m of the line segment, and the reference direction α.

In the flow measuring device 1 in a third aspect of the present disclosure, the housing 3 includes a pillar body 41 on the downstream side of the outlet 6. When the outlet 6 and the pillar body 41 are projected onto a projection plane A perpendicular to the reference direction α, the outlet 6 and the pillar body 41 partly overlap with each other on the projection plane A. A particular cross section B of a cross section of the pillar body 41 that is perpendicular to a longitudinal direction α of the pillar body 41 includes two tops 42 that project perpendicular to the reference direction α, an upstream end 43 that projects into an upstream side in the reference direction α, and a downstream end 44 that projects into the downstream side in the reference direction α. A relationship of $\theta5<\theta6<90°$ is satisfied, where: $\theta5$ is assumed to be an angle formed by the two tops 42 and the upstream end 43 on the particular cross section B; and $\theta6$ is assumed to be an angle formed by the two tops 42 and the downstream end 44 on the particular cross section B.

In the flow measuring device 1 in a fourth aspect of the present disclosure, the sub passage 5 includes a straight passage 38 that extends from the outlet 6 in an opposite direction from the reference direction α. The housing 3 includes a pillar body 41 in the straight passage 38. The second to fourth aspects of the present disclosure can also achieve similar operation and effects to the first aspect of the present disclosure.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A flow measuring device adapted to be inserted in a main passage through a hole, which is provided at a pipe defining the main passage, and to be fixed to the pipe, the flow measuring device generating a signal in accordance with a flow rate of measured gas in the main passage and comprising:
   a housing that includes a sub passage, through which measured gas flowing in the main passage is taken in to flow, and that is inserted in the main passage, wherein the housing includes a sealing part that prevents a leak of measured gas at the hole; and
   a flow sensor that is disposed in the sub passage to generate the signal in accordance with the flow rate of measured gas in the main passage by heat transfer between the flow sensor and measured gas flowing through the sub passage, wherein:
   a direction connecting an upstream end and a downstream end of the sealing part is defined as a reference direction;
   an outlet of the sub passage that returns measured gas, which has passed through the flow sensor, from the sub passage to the main passage opens on an outer wall of the housing toward a downstream side in the reference direction;
   the outer wall of the housing includes a protrusion on the downstream side of the outlet;
   when the outlet and the protrusion are projected onto a projection plane perpendicular to the reference direction, the outlet and the protrusion partly overlap with each other on the projection plane; and
   with regard to an upstream end, a downstream end, and a top of the protrusion, a relationship of $\theta1<\theta2<90°$ is satisfied, where:
   $\theta1$ is an angle formed between a direction from the upstream end to the top, and the reference direction;
   $\theta2$ is an angle formed between a direction from the downstream end to the top, and the reference direction;
   on a cross-sectional surface of the housing perpendicular to a direction in which the flow measuring device is inserted in the main passage through the hole of the pipe,
   the direction from the upstream end to the top accords with a direction of an upstream flat surface of the protrusion;
   the direction from the downstream end to the top accords with a direction of a downstream flat surface of the protrusion,
   wherein the upstream end is a point on the cross-sectional surface, at which the upstream flat surface intersects with the outer wall of the housing,
   wherein the downstream end is a point on the cross-sectional surface, at which the downstream flat surface intersects with the outer wall of the housing; and
   wherein the downstream flat surface, located between the top of the protrusion and the point on the cross-sectional surface at which the downstream flat surface intersects with the outer wall of the housing, is non-perpendicular relative to the reference direction.

2. The flow measuring device according to claim 1, wherein the top is included in a curved surface that is convex on a side on which the protrusion protrudes.

3. The flow measuring device according to claim 1, wherein:
   the protrusion is one of a plurality of protrusions; and
   the plurality of protrusions are arranged side by side in a direction perpendicular to the reference direction.

\* \* \* \* \*